(12) United States Patent
Yuasa et al.

(10) Patent No.: US 6,710,984 B1
(45) Date of Patent: Mar. 23, 2004

(54) MAGNETORESISTIVE EFFECT DEVICE UTILIZING A MAGNETIZATION-COUPLING LAYER WHICH COUPLES ADJACENT FERROMAGNETIC LAYERS PERPENDICULARLY

(75) Inventors: Hiromi Yuasa, Kanagawa-ken (JP); Yuzo Kamiguchi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 332 days.

(21) Appl. No.: 09/668,471

(22) Filed: Sep. 25, 2000

(30) Foreign Application Priority Data

Sep. 24, 1999 (JP) .......................................... 11-269763

(51) Int. Cl.$^7$ ................................................. G11B 5/39
(52) U.S. Cl. .................................................. 360/324.11
(58) Field of Search ............................. 360/324.1–324.12

(56) References Cited

U.S. PATENT DOCUMENTS 5,949,622 A   9/1999 Kamiguchi et al.
6,317,297 B1 * 11/2001 Tong et al. .................. 360/314

FOREIGN PATENT DOCUMENTS

EP   0 687 917   12/1995

OTHER PUBLICATIONS

J. C. Slonczewski, "Fluctuation Mechanism for Biquadratic Exchange Coupling in Magnetic Multilayers", Physical Review Letters, vol. 67, No. 22, Nov. 25, 1991, pp. 3172–3175.

A. Fuss et al., "Short–and Long Period Oscillations in the Exchange Coupling of Fe Across Epitaxially Grown Al– and Au–Interlayers", Journal of Magnetism and Magnetic Materials 103(1992), pp. L221–L227.

C. J. Gutierrez et al., "Strong Temperature Dependence of the 90° Coupling in Fe/Al/Fe(001) Magnetic Trilayers", Journal of Magnetism and Magnetic Materials 116(1992), pp. L305–L310.

(List continued on next page.)

*Primary Examiner*—A. J. Heinz
(74) *Attorney, Agent, or Firm*—Oblon, Spivak, McClelland, Maier & Neustadt, P.C.

(57) ABSTRACT

A magnetoresistance effect element has two ferromagnetic films separated by an interlayer film coupling the magnetization of one ferromagnetic layer in a direction perpendicular to the magnetization direction of the other ferromagnetic film, with an antiferromagnetic layer disposed adjacent to one of the ferromagnetic layers, and a free magnetic layer disposed adjacent to an antiferromagnetic film. The heat treatment for producing in the free layer a simple magnetic domain and the heat treatment for fixing the magnetizations of the ferromagnetic layers are simultaneously carried out. Thereby, because maintaining a difference between the blocking temperature of the antiferromagnetic layer adjacent to the free layer and the blocking temperature of an antiferromagnetic layer adjacent to the pin layer becomes unnecessary, an antiferromagnetic layer having a high exchange coupling magnetic field and a high blocking temperature can be selected. Also, because the allowable range to the dispersion of the exchange coupling magnetic field is widen, thinning of the film of the antiferromagnetic layer can be realized and the magnetoresistance effect element can be suitably applied to a magnetic reproducing head requiring a narrow gap.

38 Claims, 20 Drawing Sheets

OTHER PUBLICATIONS

Z. Celinski et al., "Analysis of Bilinear and Biquadratic Exchange Coupling in Fe/Ag/Fe(001) Trialyers", J. Appl. Phys. 73(10), May 15, 1993, pp. 5966–5968.

B. Heinrich et al., "Magnetic Anisotropies and Exchange Coupling in Ultrathin fcc Co(001) Structures", Physical Review B, vol. 44, No. 17, Nov. 1, 1991, pp. 9348–9361.

B. Heinrich et al., "Bilinear and Biquadratic Exchange Coupling in bcc Fe/Cu/Fe Trialyers: Ferromagnetic–Resonance and Surface Magneto–Optical Kerr–Effect Studies", Physical Review B, vol. 47, No. 9, Mar. 1, 1993, pp. 5077–5089.

J. J. Krebs et al., "Interlayer Thickness Dependence of the Strong 90° Coupling in Epitaxial CoFe/Mn/CoFe Trialyers", J. Appl. Phys. 79(8), Apr. 15, 1996, pp. 4525–4526, 3793.

M. Rührig et al., "Domain Observations on Fe–Cr–Fe Layered Structures", Phys. Stat. Sol. (a) 125 (1991), pp. 635, 638–657.

J. C. Slonczewski, "Overview of Interlayer Exchange Theory", Journal of Magnetism and Magnetic Materials 150 (1995), pp. 13–24.

Z. Celinski et al., "The Temperature Dependence of the Bilinear and Biquadratic Exchange Coupling in Fe/Cu,Ag/Fe(001) Structures", Journal of Magnetism and Magnetic Materials 145 (1995), pp. L1–L5.

J. C. Slonczewski, "Origin of Biquadratic Exchange in Magnetic Multilayers (invited)", J. Appl. Phys. 73 (10), May 15, 1993, pp. 5957–5962.

M. E. Filipkowski et al., "Temperature Dependence of the 90° Coupling in Fe/Al/Fe(001) Magnetic Trilayers", J. Appl. Phys. 73(10), May 15, 1993, pp. 5963–5965.

C. Chesman et al., "Biquadratic Exchange Coupling in Sputtered Fe/Cr/Fe(100) Sandwich Structures", J. Appl. Phys 81 (8), Apr. 15, 1997, pp. 3791–3793.

* cited by examiner pinned (fixed) region

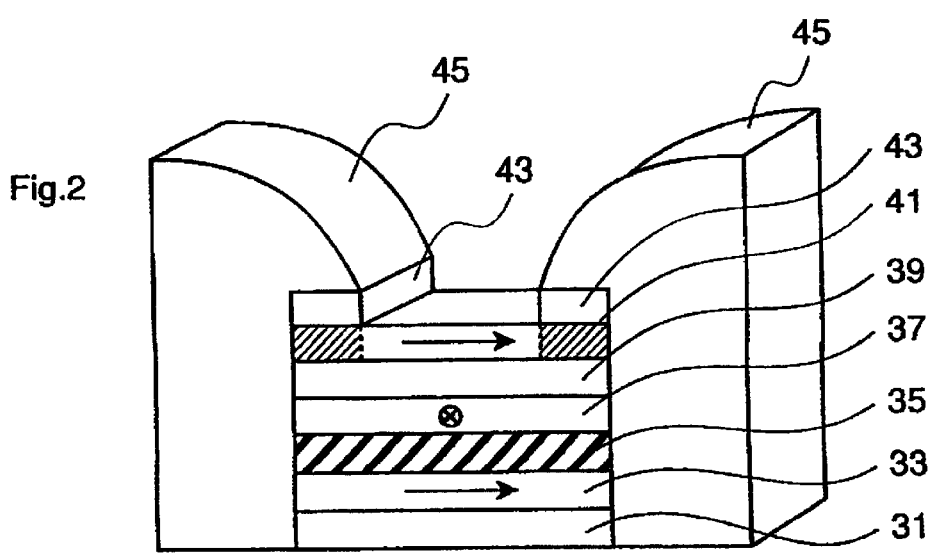

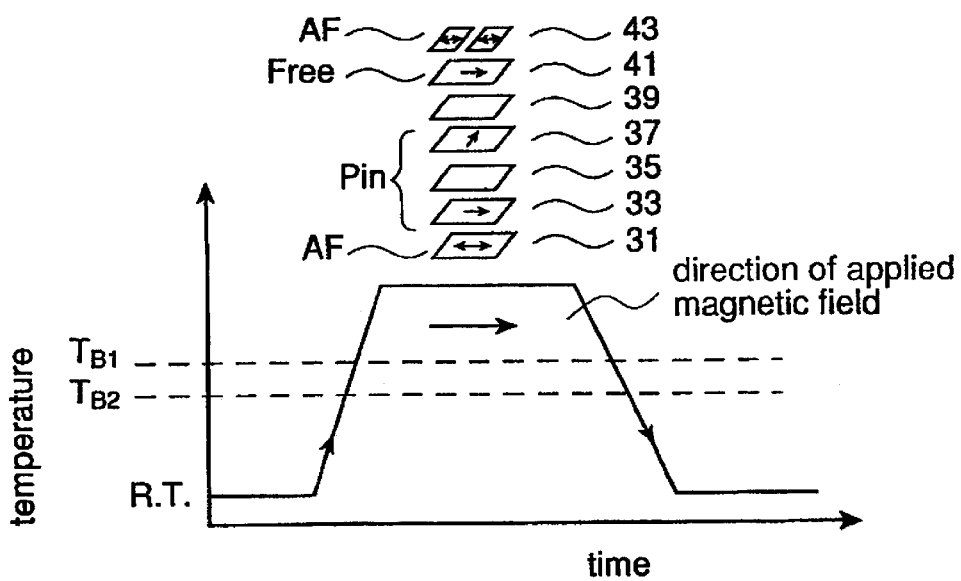

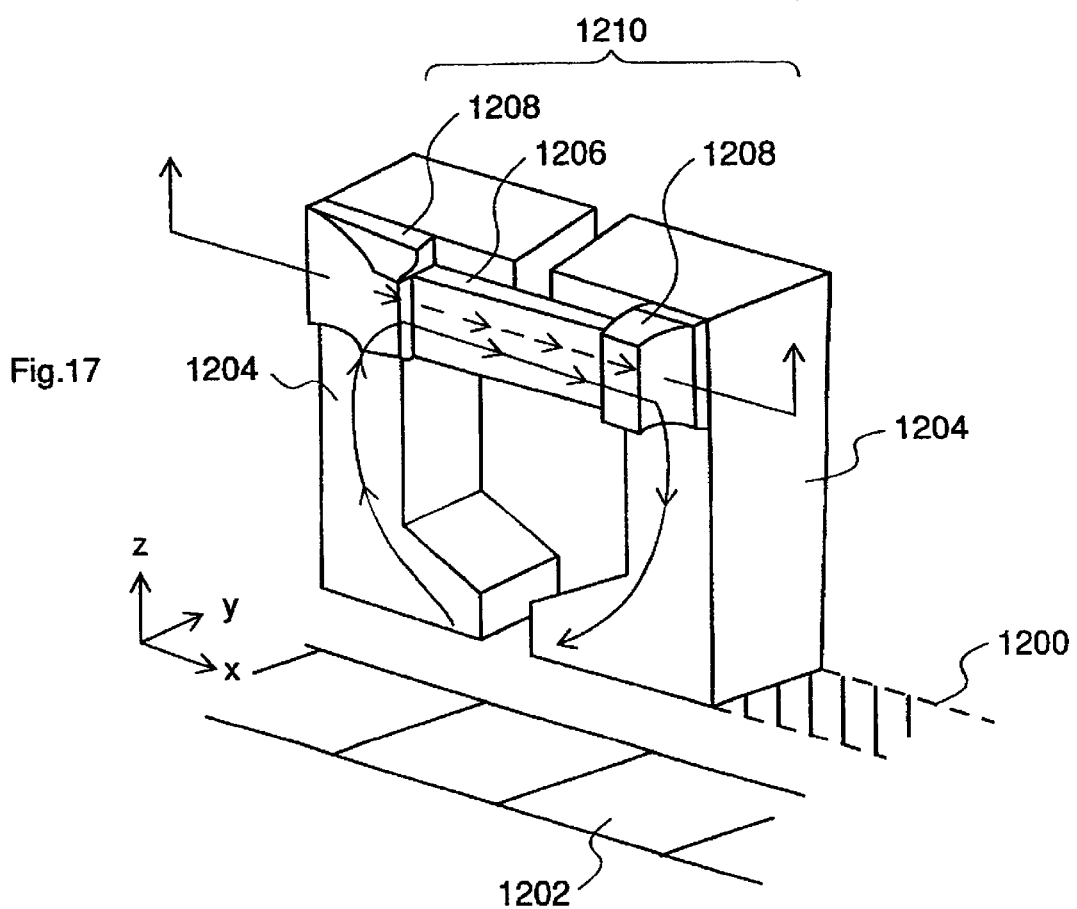

MAGNETORESISTIVE EFFECT DEVICE UTILIZING A MAGNETIZATION-COUPLING LAYER WHICH COUPLES ADJACENT FERROMAGNETIC LAYERS PERPENDICULARLY

FIELD OF THE INVENTION

The present invention relates to a magnetoresistance effect element detecting the change of an external magnetic field, a magnetoresistance effect head equipped with the magnetoresistance effect element, a magnetic reproducing apparatus mounting the magnetoresistance effect head, and further a magnetic laminate having two ferromagnetic layers the magnetization directions of which cross approximately perpendicularly.

BACKGROUND OF THE INVENTION

Hitherto, for reading magnetic information recorded in a magnetic recording medium, a method of relatively moving a reproducing magnetic head having a coil and a recording medium and detecting the voltage induced to the coil by the magnetic induction generated at the case has been used. Thereafter, a magnetoresistance effect element (hereinafter, referred to as an MR element) reproducing magnetic information by utilizing a magnetoresistance effect that the electric resistance of a specific ferromagnetic substance changes in response to the intensity of an external magnetic field was developed (see, IEEE MAG-7, 150 (1971), etc.). The MR element is used for a magnetic field sensor as well as is used as a magnetoresistance effect head (hereinafter, referred to as MR head) mounted on a magnetic reproducing apparatus such as a hard disk drive, etc.

Recent efforts have been made to obtain small size and increased capacity in a magnetic recording medium mounted on a magnetic reproducing apparatus. However, the relative speed of a magnetic head for reproducing and a magnetic recording medium at information reading becomes slower, and the expectation to obtain an MR head capable of obtaining a large output even with a slow relative speed has been increased.

For such an expectation, a very large magnetoresistance effect film has been developed. The very large magnetoresistance effect film is a multilayer film, or so-called artificial lattice film formed by alternately laminating ferromagnetic metal films and non-magnetic metal films, such as Fe/Cr and Fe/Cu, and antiferromagnetically-coupling the adjacent ferromagnetic metal films [see, Phys. Rev. Lett., 61, 2474 (1988); Phys. Rev. Lett., 64, 2304(1990), etc.]. However, because in the artificial lattice film, the magnetic field required for saturating the magnetization is large, the artificial lattice film is not suitable as a film material for the MR head.

On the other hand, there is reported an example that a large magnetoresistance effect is realized in the MR film of a multilayer film composed of a ferromagnetic metal layer/a non-magnetic metal layer/a ferromagnetic metal layer formed by holding the non-magnetic metal layer between the upper and lower ferromagnetic metal layers, wherein the two ferromagnetic metal layers are not magnetically-coupled (non-coupling). The MR film has the feature that the magnetization (spin) of one ferromagnetic metal layer is fixed and the magnetization of the other ferromagnetic metal layer is magnetization-inverted by an external magnetic field. Thereby, by changing the relative angles to the spin directions of the ferromagnetic metal layers disposed holding a non-magnetic layer between them, a magnetoresistance effect is obtained, whereby such an MR element is called a spin valve element (see, Phys. Rev. B 45, 806 (1992); J. Appl. Phys. 69, 4774(1991), etc.).

Although the rate of change of the magnetoresistance of such a spin valve element is small as compared with the artificial lattice film, because the magnetic field required for saturating the magnetization is small, the element is suitable for the use of MR head, and the element has already been practically used.

A general spin valve element has a laminated structure of a ferromagnetic free layer, an intermediate non-magnetic layer, a ferromagnetic pin layer, and an antiferromagnetic layer. The magnetization of the ferromagnetic pin layer adjacent to the antiferromagnetic layer is fixed to one direction under an external magnetic field by an exchange bias magnetic field from the antiferromagnetic layer. On the other hand, the ferromagnetic free layer can be freely rotated to an external magnetic field and the parallel/anti-parallel state of the magnetizations of the ferromagnetic free layer and the ferromagnetic pin layer can be easily realized in a low magnetic field. In addition, when the magnetizations of both the ferromagnetic layers are in a parallel state, the electric resistance of the element is low, and when the magnetizations are in an anti-parallel state, the electric resistance becomes high. In the spin valve element, by increasing the difference of the two resistance values, high magnetoresistance effect amplitude is obtained.

When the spin valve element is practically used, to obtain a high susceptibility by utilizing the linear region of the resistant change, it is preferred to apply a bias such that the magnetization of the ferromagnetic free layer crosses the magnetization of the pin layer at about a right angle in a zero magnetic field. The bias is also important in the meaning that the magnetization of the free layer becomes a simple magnetic domain so that Barkhausen noise is not generated in the case of rotating the magnetization of the free layer to an external magnetic field. A hard magnetic film having the same function as a magnet is formed at the side surface of the spin valve film for forming a single magnetic domain in the magnetic layer.

When the thickness of the hard magnetic film is same as the thickness of the ferromagnetic free layer, a proper bias can be applied and when the thickness of the hard magnetic layer is thinner than the above-described thickness, the formation of the simple magnetic domain of the ferromagnetic free layer is hard to attain due to an insufficient bias. Also, when the thickness of the hard magnetic film becomes thicker than the thickness of the free layer, the bias becomes excessive, whereby the permeability of the ferromagnetic free layer is lowered.

However, under present conditions, when the thickness of the hard magnetic film is thinned to a thickness the same as that of the ferromagnetic free layer, because the joining area of both the members becomes small, magnetic joining cannot be made well, and thus, the hard magnetic film must be made thicker than the thickness of the ferromagnetic free layer. As the result thereof, a bias applied to the ferromagnetic free layer becomes excessive, whereby the permeability of the ferromagnetic free layer is lowered to give a loss to the susceptibility and the output.

For solving these problems, a spin valve element employing the construction that an antiferromagnetic layer of a definite form is laminated to the end portion of the free layer to fix the magnetization of the end portion of the free layer by the exchange coupling of the antiferromagnetic layer and the free layer, and a bias is applied from the portion to the central magnetic field response portion of the free layer is proposed. Because the construction is a bias method using the antiferromagnetic layer worked in a definite form (pattern), the construction is called a patterned bias structure.

A slant view of a spin valve element of the patterned bias structure is shown in FIG. 1A. The spin valve element has a first antiferromagnetic layer 1, a ferromagnetic pin layer 3, an intermediate non-magnetic layer 5, and a ferromagnetic free layer 7 successively laminated from below, and further has a pair of second antiferromagnetic layers 9 laminated to both ends of the ferromagnetic free layer 7 in the lengthwise direction and a pair of lead electrodes 11. Both ends of the ferromagnetic free layer 7 and the ferromagnetic pin layer 3 are applied with the magnetization of uni-directional anisotropy in FIG. 1A by the magnetic exchange coupling of each of the second antiferromagnetic layers 9 and the first antiferromagnetic layer 1. That is, both end portions (oblique line portions) of the ferromagnetic free layer 7 laminated with the second antiferromagnetic layers 9 are magnetization fixed in the left-to-right direction in the figure by the exchange coupling of both members and function like a hard magnetic film. Also, the magnetization of the central magnetic field response portion held between both end portions has a magnetization of uni-directional anisotropy in the direction of the arrow in a zero magnetic field, from the bias magnetic fields of both end portions of the second antiferromagnetic layer 9 and the ferromagnetic free layer 7. On the other hand, the magnetization of the ferromagnetic pin layer 3 is fixed to a direction from the front surface to the back surface of the paper shown in FIG. 1A by the exchange coupling with the first antiferromagnetic layer 1.

In the patterned bias structure, the two exchange coupling films of the exchange coupling film of the second antiferromagnetic layer 9 and the ferromagnetic free layer 7 and the exchange coupling film of the first antiferromagnetic layer 1 and the ferromagnetic pin layer 3 become necessary. The impartation of uni-directional anisotropy to ferromagnetic layers of the exchange coupling films is carried out by a heat treatment in a magnetic field since the magnetizations of the ferromagnetic pin layer 3 and the ferromagnetic free layer 7 are each directly influenced, a heat treatment must be applied while applying different magnetic fields to each of the antiferromagnetic layers 1 and 9. When the blocking temperature of the first antiferromagnetic layer 1 wherein the exchange coupling magnetic field with the ferromagnetic pin layer 3 becomes zero is $T_{B1}$ and the blocking temperature of the second antiferromagnetic layer 9 wherein the exchange coupling magnetic field with the ferromagnetic free layer becomes zero is $T_{B2}$, the heat treatment process (time-temperature) is shown in FIG. 1B. In addition, because the antiferromagnetic films have a uniaxial anisotropy, a two-direction arrow for the sake of convenience shows the magnetization states.

For completely carrying out the magnetization fixing by the first and second antiferromagnetic layers 1 and 9, two kinds of antiferromagnetic layer materials having a large blocking temperature difference $|Tb_1-Tb_2|$ become necessary and further, two kinds of antiferromagnetic layer materials showing a small dispersion of the exchange coupling magnetic field to the extent of not overlapping the exchange coupling magnetic fields of both members become necessary. Furthermore, in addition to these conditions, the materials having both the high exchange coupling magnetic field and the characteristics of the high blocking temperature, which are essentially important in the case of using the spin valve element cannot easily be found.

On the other hand, in the three layer structure of CoFe/Mn/CoFe, etc., by an epitaxial growth, the magnetic right-angle cross coupling between the two ferromagnetic layers CoFe is observed (see. J. Appl. Phys. 79 (8), Apr. 15, 1996, etc.).

SUMMARY OF THE INVENTION

The present invention provides a novel magnetoresistance effect element made under these circumstances and particularly provides a magnetoresistance effect element, a magnetoresistance effect element head, a magnetic reproducing apparatus, and a magnetic laminate at a low production cost.

That is, the first aspect of the invention provides a magnetoresistance effect element having a first antiferromagnetic layer; a first ferromagnetic layer which is a ferromagnetic layer exchange coupled to the first antiferromagnetic layer and has a magnetization in a first direction; a magnetization-coupling layer laminated to the first ferromagnetic layer; a second ferromagnetic layer laminated to the first ferromagnetic layer via the magnetization-coupling layer and has a magnetization of a direction crossing at about a right angle to the first direction by magnetization-coupling to the first ferromagnetic layer by the magnetization-coupling layer; an intermediate non-magnetic layer; a third ferromagnetic layer which is laminated to the second ferromagnetic layer via the intermediate non-magnetic layer and has a magnetization of an about the same direction as the first direction in the state that an external magnetic field is zero; and a second antiferromagnetic layer exchange coupled to the third ferromagnetic layer.

Also, the second aspect of the invention provides a magnetoresistance effect element having a first ferromagnetic layer having magnetization in a first direction; an inserted layer having a mixed phase film containing at least two kinds of oxides of the same metal each having a different valence number, or a laminated film formed by laminating at least two oxide layers of the same metal each having a different valence number, and laminated to the first ferromagnetic layer; a second ferromagnetic layer formed by laminated onto the first ferromagnetic layer via the inserted layer and having a magnetization in the direction crossing at almost a right angle to the first direction; an intermediate non-magnetic layer; and a third ferromagnetic layer laminated to the second ferromagnetic layer via the intermediate non-magnetic layer and having a magnetization in about the same direction as the first direction in the state that an external magnetic field is zero.

In each of these magnetoresistance effect elements, the second ferromagnetic layer and the third ferromagnetic layer holding the intermediate non-magnetic layer in the state that an external magnetic field is zero have the magnetizations which are in a crossing relation at about a right angle to each other when an external magnetic field is zero. Also, the magnetization direction of the first ferromagnetic layer and the magnetization direction of the second ferromagnetic layer are coupled in a crossing direction at about a right angle by the magnetization-coupling layer or the insertion layer. Accordingly, the magnetization directions of the first and third ferromagnetic layers can be oriented almost in the same direction, whereby a heat treatment step for imparting a magnetic bias can be reduced and thus the production process can be simplified.

In addition, such a simplification of the process largely contributes to the improvement of the productivity of magnetic heads, and the magnetoresistance effect heads and further magnetic reproducing apparatus each having a low cost can be provided.

For the magnetic bias to the first and third ferromagnetic layers, in addition to the exchange coupling bias using the first and second antiferromagnetic layers mentioned in the first aspect of the invention, a hard magnetic layer, a laminated film of plural ferromagnetic layers, a laminated layer of a ferromagnetic layer and a non-magnetic phase, a laminated film of an antiferromagnetic layer and a ferromagnetic layer, and a laminated film of a hard magnetic layer and a ferromagnetic layer can be used in place of the antiferromagnetic layer.

Also, to impart the magnetic bias, freedom is obtained in the selection of these same-quality materials. For example, when an antiferromagnetic layer is used to impart the magnetic bias, it becomes unnecessary to form a difference in the blocking temperatures of two antiferromagnetic layers and the materials can be properly selected from well-known materials, such as IrMn, PtMn, FeMn, NiMn, NiO, $\alpha$—$Fe_2O_3$, etc.

In the magnetoresistance effect element, the magnetoresistance effect head, and the magnetic reproducing apparatus of the invention, it is preferred to have the following constitutions.

1) The second ferromagnetic layer is a magnetization-free layer changing magnetization direction with a change in an external magnetic field, and the third ferromagnetic layer is a magnetization spin layer wherein the magnetization direction is not substantially changed by the external magnetic field by which the magnetization of the above-described magnetization free layer is changed. In this case, the magnetization of the first ferromagnetic layer may rotate with the change of the magnetization direction of the second ferromagnetic layer or may not rotate. In addition, the second and third ferromagnetic layers can be magnetically non-coupling with each other.

2) The third ferromagnetic layer is a magnetization free layer changing magnetization direction with a change in an external magnetic field, and the second ferromagnetic layer is a magnetization pin layer wherein the magnetization direction is not substantially changed in the external magnetic field by which the magnetization of the magnetization free layer is changed. In this case, it is preferred that the magnetization of the first ferromagnetic layer is not substantially changed in the external magnetic field by which the magnetization of the magnetization free layer is changed. In addition, the second and third ferromagnetic layers can be magnetically non-coupling with each other.

3) The first antiferromagnetic layer is laminated onto both end portions of the first ferromagnetic layer in the lengthwise direction, and/or the second antiferromagnetic layer is formed on both end portions only of the third ferromagnetic layer in the lengthwise direction.

4) The first antiferromagnetic layer is formed covering one whole surface of the first ferromagnetic layer.

5) A non-magnetic layer is further formed between the first antiferromagnetic layer and the first ferromagnetic layer or between the second antiferromagnetic layer and the third ferromagnetic layer.

6) The first, second, and third ferromagnetic layers have two ferromagnetic layers and an antiferromagnetic coupling interlayer antiferromagnetically magnetization-coupling these layers. The two ferromagnetic layers which are antiferromagnetically coupled and the interlayer constitute a unit called a synthetic antiferromagnetic film and because the two ferromagnetic layers turn an anti-parallel direction. The magnetic field is closed in the unit, whereby the magnetic field leakage to the outside can be reduced and also a bias point can be suitably controlled.

7) The magnetization-coupling layer or the inserted layer has a mixed phase film containing at least two kinds of the oxides of the same metal each having a different valence number, or a laminated film formed by laminating at least two layers of the oxides of the same metal each having a different valence number. In this case, the oxides of the same metal each having a different valence number are:

7-1) selected from FeO, $Fe_3O_4$, $\alpha$—$Fe_2O_3$, and $\gamma$—$Fe_2O_3$;

7-2) selected from CrO, $Cr_2O_3$, $CrO_2$, $Cr_2O_5$, $CrO_3$, and $CrO_5$;

7-3) MnO and $MnO_2$.

8) The magnetization-coupling layer or the inserted layer is an insulating layer made of an oxide, etc., and by further having new insulating layers holding an intermediate non-magnetic layer between them together with the magnetization coupling layer, the element, etc., of the invention has a construction wherein an electron specular reflection is induced at the interface of each insulating layer and the reflected electron returns again to the interface with the intermediate non-magnetic layer. The electron-reflecting layer is known as a specular effect.

9) When an external magnetic field is applied, the first and second ferromagnetic layers cross-coupled with each other by the magnetization coupling layer or the inserted layer causes following two kinds of magnetizing rotations by the selection of materials, etc.:

9-1) The right angle-cross coupling is cut, the exchange coupling of the first ferromagnetic layer and the first antiferromagnetic layer is maintained, and the second ferromagnetic layer only causes a magnetizing rotation.

9-2) The right angle-cross coupling is maintained and by cutting the coupling of the first ferromagnetic layer and the first antiferromagnetic layer, the magnetizations of the first and second ferromagnetic layers are rotated with an external magnetic field.

In addition, the magnetoresistance effect head of the invention may comprise:

10) a so-called shield-type head wherein the magnetoresistance effect element is disposed in the magnetic gap in the vicinity of the opposite surface of the medium of the magnetic head. Thinning the antiferromagnetic layer increases the dispersion of the exchange coupling magnetic field of the exchange coupling film but because according to the invention, it becomes unnecessary to avoid the occurrence of overlapping of dispersions, film thinning of the antiferromagnetic layer can be easily realized. Such thinning of the antiferromagnetic layer is suitable for narrowing the gap of the shield-type magnetoresistance effect head and has an effect of contributing to the increase of the density thereof.

11) a yoke-type magnetoresistance effect head wherein the magnetoresistance effect element is disposed apart from the opposite surface of the medium, and having magnetic yokes transmitting a signal magnetic field from the medium to the magnetoresistance effect element by extending from the opposite surface of the medium to the magnetoresistance effect element. In the magnetoresistance effect element of the invention, because the number of times for the heat treatment of the bias impartation can be reduced, a uniform magnetic anisotropy becomes hard to be imparted to the yoke portion and an efficient introduction of a magnetic flux from the opposite surface of the medium to the magnetoresistance effect element is expected.

Also, the third aspect of the invention provides a magnetic laminate composed of a first ferromagnetic layer having a magnetization of a first direction; a second ferromagnetic layer having a second magnetization of a direction crossing at about a right angle to the magnetization of the first direction; and a mixed phase film which is an interlayer film formed between the first and second ferromagnetic layers, and has a mixed phase film containing at least two kinds of oxides of the same metal each having a different valence number or a laminate layer containing at least two oxide layers of the same metal each having a different valence number.

BRIEF DESCRIPTION OF THE DRAWINGS

FIG. 2 is a slant cross-sectional view showing the magnetoresistance effect element of the first embodiment of the invention, FIG. 3 is a view showing the history of a heat treatment step in magnetic field performed during the production of the magnetoresistance effect element of the invention using an example of the first embodiment, FIG. 17 is a schematic slant view relating to a Yoke-type magnetic head.

DETAILED DESCRIPTION OF THE INVENTION

Figure 1A:
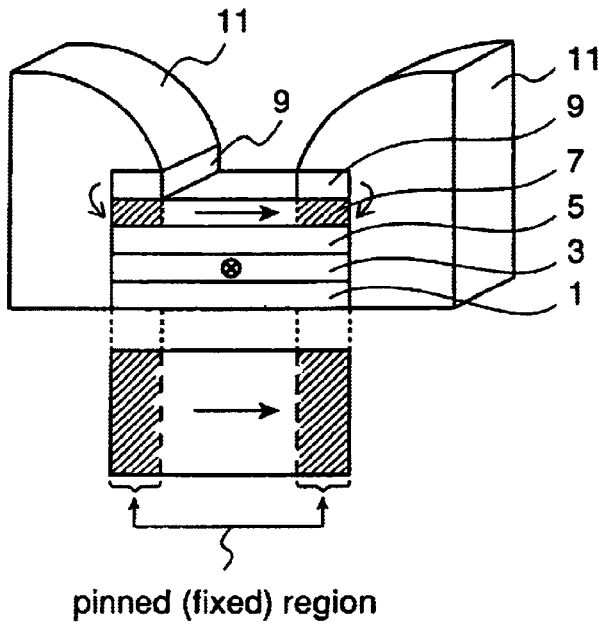
FIGS. 1A and 1B are a slant view showing a magnetoresistance effect element of a patterned bias system of prior art, and a graph illustrating the application of a magnetic field during heat cycles.
Figure 1B:
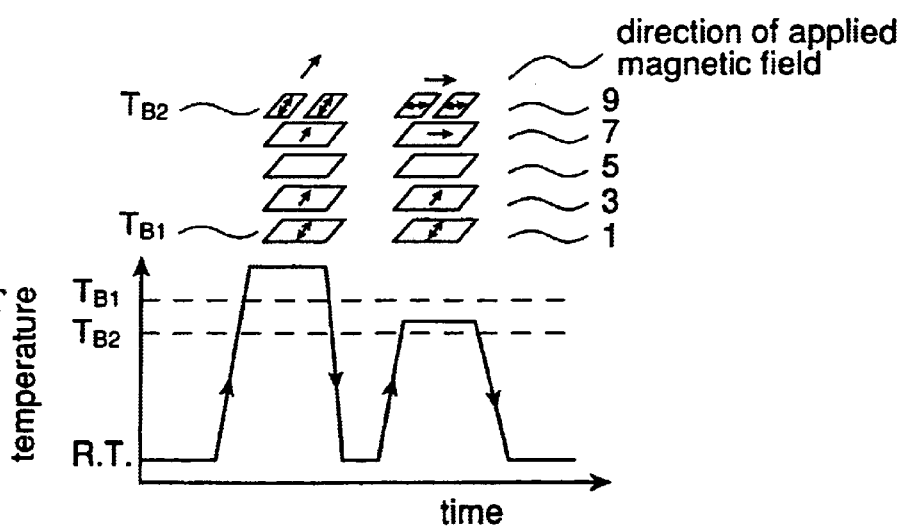

Then, the present invention is described in detail.

The First Embodiment

The first embodiment of the magnetoresistance effect element of the invention is explained using FIG. 2.

FIG. 2 is a slant view showing the magnetoresistance effect element. The front surface of FIG. 2 is an entering surface of an external magnetic field detected by the magnetoresistance effect element. Accordingly, for example, when the magnetoresistance effect element is mounted on a shield type magnetic head reading magnetically recorded information of the surface of a magnetic recording medium, the entering surface of the external magnetic field is disposed opposite to the surface of the magnetic recording medium.

The magnetoresistance effect element of the first embodiment is composed of a first antiferromagnetic layer 31, a first ferromagnetic layer 33 laminated on the first antiferromagnetic layer 31 and exchange coupled to the first antiferromagnetic layer 31, a magnetization coupling layer (inserted layer) 35 coupling the magnetizations of adjacent two ferromagnetic layers to directions crossing at about a right angle, a second ferromagnetic layer 37 having a magnetization of a direction crossing at about a right angle to the first ferromagnetic layer 33 by the coupling layer 35, an intermediate non-magnetic layer 39, and a third ferromagnetic layer 41 successively laminated, and has a pair of second antiferromagnetic layers 43 and a pair of lead electrodes 45 formed on both end portions of the third ferromagnetic layer 41 in the lengthwise direction thereof. In addition, the magnetoresistance effect element is formed on a ceramic substrate, etc., (not shown) via a magnetic gap, a magnetic shield, etc., (not shown).

The first ferromagnetic layer 33 has a magnetization substantially fixed in the direction of the arrow (left-to-right direction of the figure) of FIG. 2 by the exchange coupling with the first antiferromagnetic layer 31. The magnetizations of the first and second ferromagnetic layers 33 and 37 are coupled to each other in directions crossing at about a right angle by the coupling layer 35 for the right angle-cross magnetizations, whereby the magnetization of the second ferromagnetic layer 37 is fixed in the direction from the front surface to the back surface of FIG. 2. The second ferromagnetic layer 37 with its magnetization fixed is a so-called ferromagnetic pin layer, the magnetization of which does not substantially move even when exposed to an external magnetic field such as a signal magnetic field, etc.

The third ferromagnetic layer 41 adjacent to the ferromagnetic pin layer 37 via the intermediate non-magnetic layer 39 is a ferromagnetic free layer and the magnetization direction of the central magnetic field response portion is free to an extent to be rotated by an external magnetic field.

To apply a magnetic bias to the ferromagnetic-free layer 41, the second antiferromagnetic layers 43 are disposed on the end portions (oblique line hatched potions) of the track width directions of the ferromagnetic free layers 41, and both end portions of the ferromagnetic free layer 41 are magnetization fixed to the direction of the arrow (left-to-right direction of the figure) of FIG. 2 by exchange coupling to the second antiferromagnetic layers 43. Accordingly, the central portion of the ferromagnetic free layer 41 receives a bias magnetization of the rightward direction of FIG. 2 and has a magnetization in the direction shown by the arrow of FIG. 2 in a zero magnetic field. Thus, in the ferromagnetic pin layer 37 and the ferromagnetic free layer 41 via the intermediate non-magnetic layer 39, so-called spin valve element wherein the magnetizations are in a right angle-crossing relation can be realized.

In addition, in the construction of FIG. 2, the left and right directions of the figure described correspond to the track width direction of the magnetoresistance effect element, and the width of the reproducing track almost corresponds to the width of the central magnetic field response portion of the ferromagnetic free layer.

Now, in the spin valve element, the exchange coupling of the first ferromagnetic layer 33 and the ferromagnetic free layers 41 can create magnetization in the same direction. Adding the coupling layer 35 for right angle-crossing coupling and the first ferromagnetic layer 33, which are not seen in a spin valve element of the prior art, could attain this.

The heat treatment step in magnetic field in the production process of the spin valve element can be carried out in a uni-direction magnetic field (the rightward direction of FIG. 3) in the state of a higher temperature than the blocking temperatures (for example, $T_{B1}$, $T_{B2}$) as shown in the relation of the heat-treatment time and the heat-treatment temperature of FIG. 3. This is simpler as compared with the heat treatment in magnetic field of two steps of prior art, and contributes to improve the productivity of the spin valve element. In addition, in FIG. 3, AF shows an antiferromagnetic layer, and because the antiferromagnetic layer has a uniaxial anisotropy, a two-direction arrow shows the uniaxial anisotropy. Also, the heat treatment step mentioned above is carried out after forming each layer by sputtering, etc.

The first embodiment described above relates to an element structure which is a bottom type spin valve element wherein the ferromagnetic pin layer 37 is formed closer to the substrate than the ferromagnetic free layer 41, and in which the coupling layer 35 is disposed at the ferromagnetic pin layer 37 side.

Then, the modified examples 1-1 to 1-4 of the first embodiment are successively explained. In addition, in the modified examples 1-1 to 1-4, about the same construction as the construction of the first embodiment, the same reference numerals used in the first embodiment are used and the detailed explanations of them are omitted.

Modified Example 1-1

Figure 4:
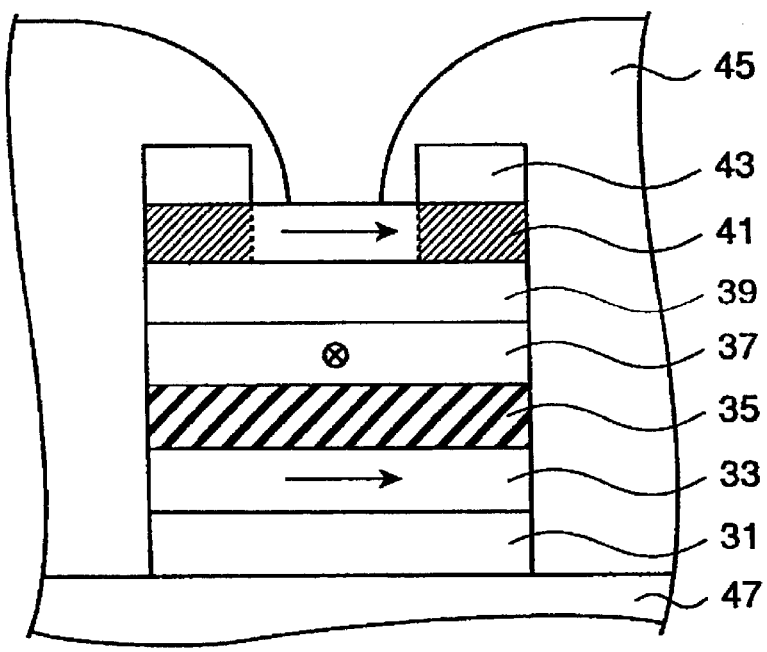
FIG. 4 is a cross-sectional view showing a modified example of the first embodiment of the invention wherein the lead of the magnetoresistance effect element of the first embodiment overlaps the central active portion of the element.

FIG. 4 is a view of the cross-section of a spin valve element of modified example 1-1 observed from the opposite surface to a medium.

The difference of the modified example 1-1 from the first embodiment is in the point that the inside end portions of a lead electrode 45 extend beyond the inner sides of the second antiferromagnetic layers 43 and cover a part of the ferromagnetic free layer 41. In FIG. 4, because the magnetization of the portions of the ferromagnetic free layer 41 shown by oblique lines is fixed by the exchange coupling with the second antiferromagnetic layers 43, these portions are dead zones which do not respond to a signal magnetic field. The central region disposed between the dead zones is a central magnetic field response portion. Accordingly, because the lead electrodes are in contact with the central response portion, the dead zones which do not contribute to the magnetoresistance effect can be electrically bypassed and thus, the susceptibility can be improved.

In addition, the reference numeral 47 in FIG. 4 and after shows a magnetic gap or a ground layer formed on a magnetic gap. The material, the crystalline property, etc., of the ground layer 47 can be properly selected so that the crystal structure, the orientation, etc., in each layer formed thereon become suitable. The layer 47 may contain $SiO_2$ or $Al_2O_3$ as the magnetic gap layer. Also, various types of material for the ground layer 47 used as an undercoating film for orienting the layer are known and are described, for example in U.S. Pat. No. 5,549,978, the disclosure of which are incorporated herein by reference.

Modified Example 1-2

Figure 5:
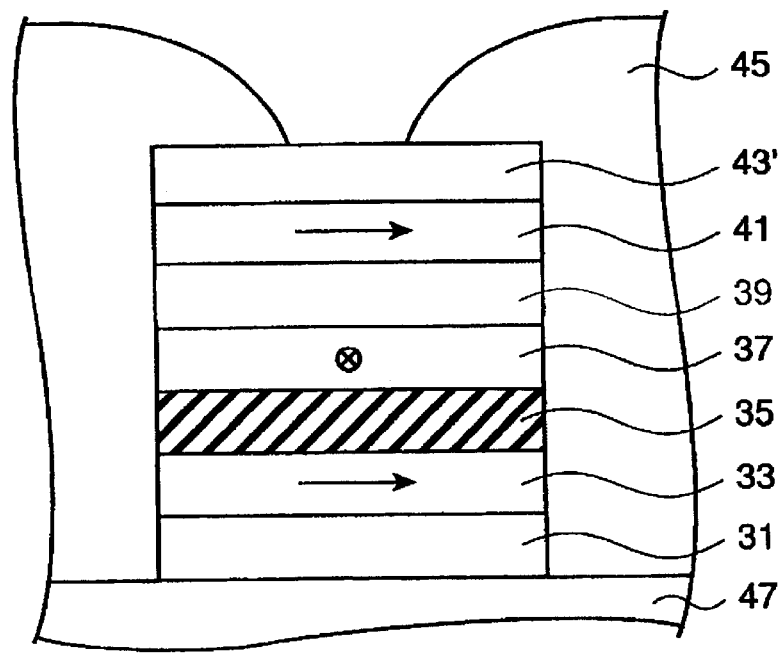
FIG. 5 is a cross-sectional view showing a modified example of the first embodiment of the invention wherein the antiferromagnetic layer adjacent to the ferromagnetic free layer of the magnetoresistance effect element is not divided into two portions in the plane.

Then, FIG. 5 shows a cross-sectional view of a spin valve element of the modified example 1-2 observed from the opposite surface to a medium.

The modified example 1-2 differs from the first embodiment in the point that the antiferromagnetic layer 43' is laminated on the while surface of the ferromagnetic free layer 41.

When the antiferromagnetic layer 43' is laminated on the whole surface of the ferromagnetic free layer 41 as described above, it is necessary that the exchange coupling force produces magnetization of the ferromagnetic layer 41 in the direction of the arrow (left-to-right direction in FIG. 5) in the state where the external magnetic field is zero but when an external magnetic field is applied, the magnetization is freely rotated in response to the magnetic field.

However, in the exchange coupling in the case of lamination over whole surfaces, the coupling is liable to become strong, and there is a possibility that the permeability of the ferromagnetic free layer 41 is lowered to lower the susceptibility.

Modified Example 1-3

Figure 6:
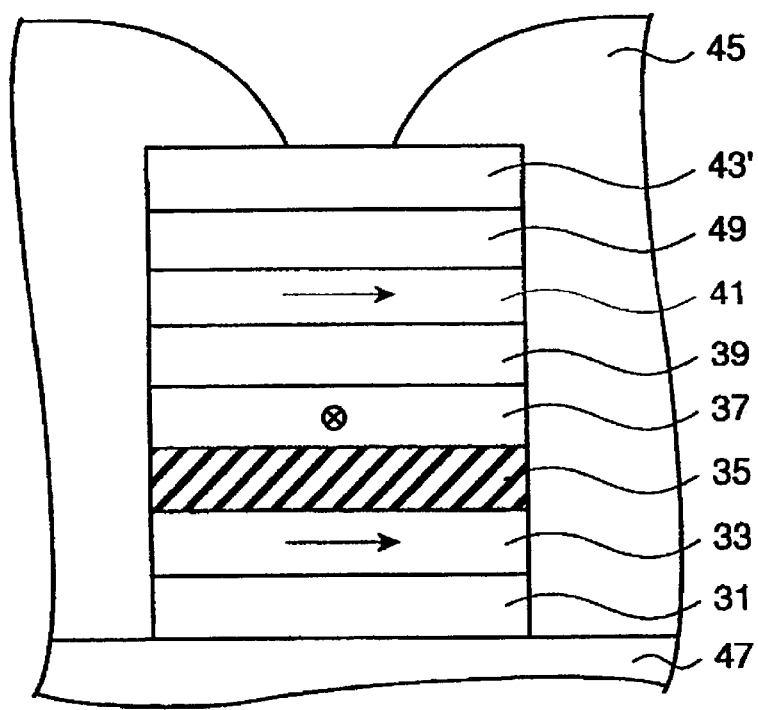
FIG. 6 is a cross-sectional view showing a modified example of the first embodiment of the invention wherein a non-magnetic layer is inserted between the ferromagnetic free layer and the antiferromagnetic layer of the magnetoresistance effect element.

To prevent lowering of the susceptibility described above, in the modified example 1-3, as shown in the cross-sectional view (observed from the opposite side of medium) of FIG. 6, by inserting a non-magnetic layer 49 between the second antiferromagnetic layer 43' and the ferromagnetic free layer 41, the exchange coupling force can be controlled to a desired value.

The modifications of the modified examples 1-2 and 1-3 can be similarly employed in the second to 4th embodiments of the invention described below.

Furthermore, the non-magnetic layer 49 controlling the magnetic coupling of the modified example 1-3 can be used in not only the construction that the antiferromagnetic layer 43' covers the whole upper surface of the adjacent ferromagnetic layer via the non-magnetic layer 49 as in the modified example 1-3 but also can be used similarly by inserting when the antiferromagnetic layer is formed on partial regions of the ferromagnetic layer as in the first embodiment or the second to 4th embodiments described below.

Modified Example 1-4

Figure 7A:
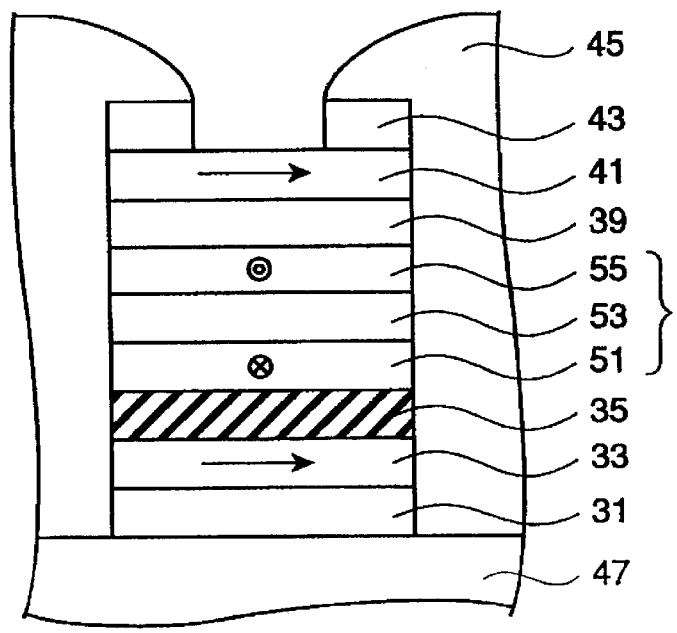
FIGS. 7A and 7B are cross-sectional views showing modified examples of the first embodiment of the invention wherein as the ferromagnetic pin layer of the magnetoresistance effect element, a laminated ferrimagnetic structure is used.

FIG. 7A is a cross-sectional view of the spin valve element of the modified example 1-4 observed from the opposite side to the medium.

In the spin valve element of the first embodiment, when the exchange coupling energy to fix the magnetization of the ferromagnetic pin layer 37 is a constant, as the magnetization of the ferromagnetic pin layer 37 is smaller, magnetization inversion becomes harder to produce. Thus, by making the ferromagnetic pin layer a laminated ferrimagnetic structure, or practically by employing a laminated structure composed of a first ferromagnetic pin layer 55, a second ferromagnetic pin layer 51, and an interlayer 53 of antiferromagnetically magnetic coupling them as shown in FIG. 7A, the magnetization inversion of the ferromagnetic pin layer 37 can be restrained. Also, in the structure of FIG. 7A, by introducing a laminated ferromagnetic structure, the magnetic field for keeping the right-angle cross-coupling can be increased. Accordingly, the magnetic field causing the magnetization inversion of the magnetic layers 33, 51, and 55 can be greatly increased.

Figure 7B:
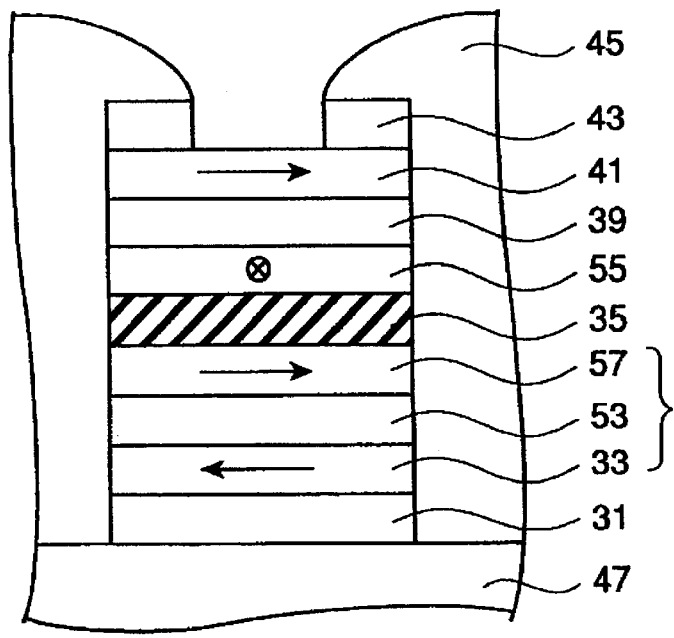

Also, as other example of introducing the laminated ferrimagnetic structure, as shown in FIG. 7B, between the first antiferromagnetic layer 31 and the magnetization-coupling layer (inserted layer) 35 for right angle-cross coupling can be inserted ferromagnetic layers 57 and 33 of the laminated ferrimagnetic structure and the interlayer 53 for antiferromagnetically magnetic coupling the ferromagnetic layers 57 and 33. In this case, the exchange coupling magnetic field of the first antiferromagnetic layer 31 and the laminated ferrimagnetic structure can be increased. In addition, for the interlayer 53 in the laminated ferrimagnetic structure, Ru, Cu, etc., are suitable.

The Second Embodiment

Figure 8:
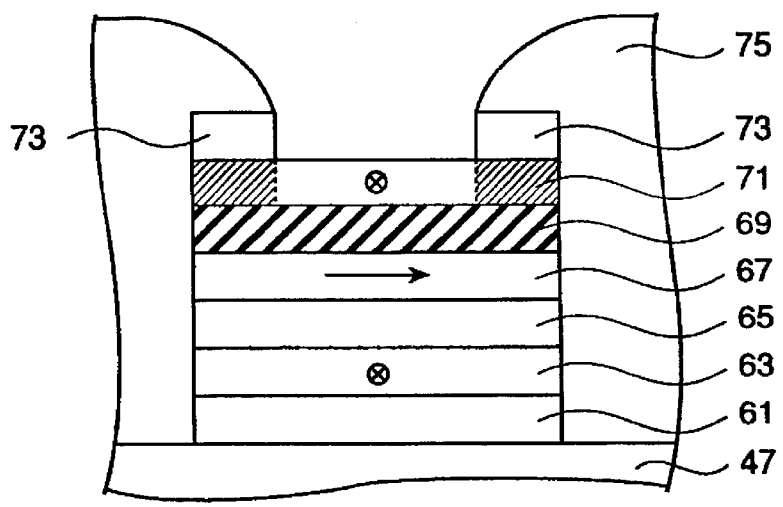
FIG. 8 is a cross-sectional view showing the magnetoresistance effect element of the second embodiment of the invention.

The second embodiment of the magnetoresistance effect element of the invention is explained using FIG. 8. FIG. 8 is a cross-sectional view of the spin valve element of the second embodiment of the invention observed from the side where an external magnetic field is applied.

As shown in FIG. 8, the second spin valve element has the construction by laminating on the surface of a ground layer 47, a first antiferromagnetic layer 61, a ferromagnetic pin layer 63, an intermediate non-magnetic layer 65, a ferromagnetic free layer 67, a magnetization coupling layer 69 for right angle-cross coupling, and a ferromagnetic layer 71 in that order, where the second antiferromagnetic layers 73 are formed on both side portions of the ferromagnetic layer 71 and lead electrodes 75 are electrically connected to these layers.

The spin valve element is a bottom type wherein the ferromagnetic layer 63 is formed closer to the ground layer side than the ferromagnetic layer 67 and also has the magnetization coupling layer (inserted layer) 69 for right angle-cross coupling at the ferromagnetic free layer 67 side. The lead electrodes 75 are same as those explained in the first embodiment.

The oblique line portions of both the ends of the ferromagnetic layer 71 are regions where the magnetization is fixed in the direction from the front surface to the back surface of FIG. 8 by the exchange coupling of the second antiferromagnetic layer 73 and give a magnetic bias in the magnetization direction to the central active region. The magnetization of the central region of the ferromagnetic layer 71 is established in the direction from the front to the back of FIG. 8 in the state where an external magnetic field is zero.

Also, the ferromagnetic free layer 67 imparted with the magnetization coupling in a direction perpendicular to the magnetization of ferromagnetic layer 71 by the interlayer has a magnetization in the direction of the arrow (left-to-right direction) as shown in FIG. 8, and the right angle crossing magnetization of the ferromagnetic pin layer 63 and the ferromagnetic free layer 67 can be realized in the state where an external magnetic field is zero.

Modified Example 2-1

As described above, by using two antiferromagnetic layers 61 and 73 having magnetizations in the same axis, the magnetizations of the ferromagnetic pin layer 63 and the ferromagnetic free layer 67 can be made approximately perpendicular.

Figure 9:
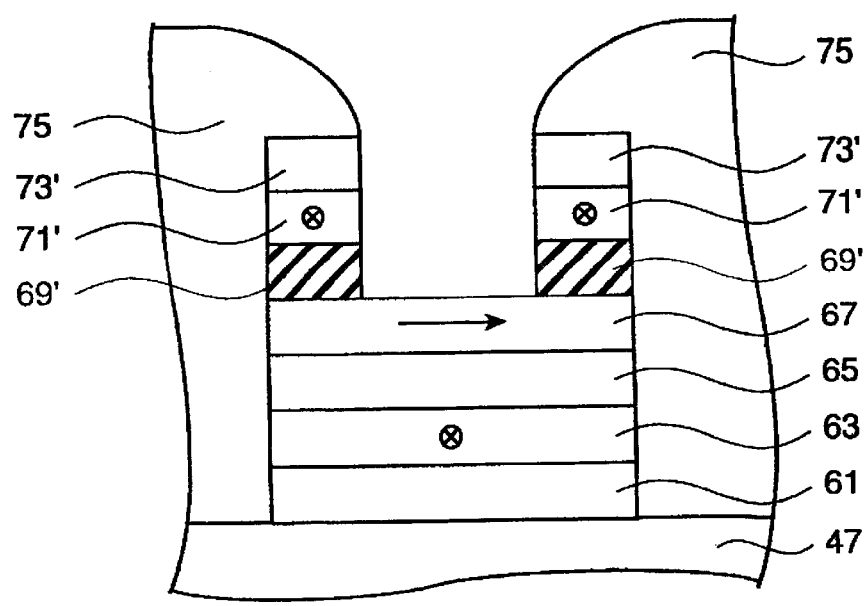
FIG. 9 is a cross-sectional, view showing a modified example of the magnetoresistance effect element of the second embodiment of the invention.

FIG. 9 is a modified example of the second embodiment and is a cross-sectional structure formed by patterning ferromagnetic layers 71' and interlayer 69' for perpendicular cross-coupling such that the positions of the interlayer match with the two second antiferromagnetic layers 73' observed from a side where an external magnetic field enters. By this construction, the shunt effect of an electric current can be reduced and the contribution of the magnetoresistance amplitude by magnetizing inversion can be substantially increased.

The Third Embodiment

Figure 10A:
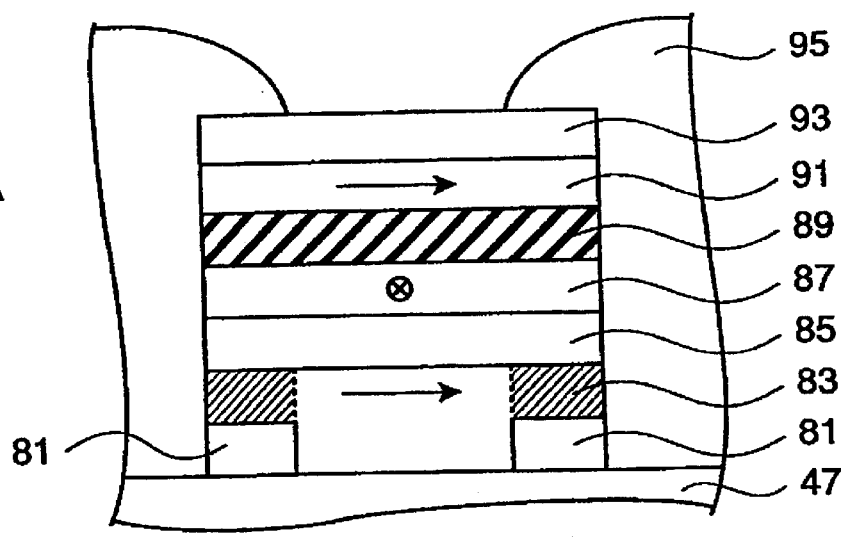
FIGS. 10A and 10B are cross-sectional views showing the magnetoresistance effect element of the third embodiment of the invention.

Then, the third embodiment of the magnetoresistance effect element of invention is explained using FIG. 10A. FIG. 10A is a cross-sectional view of spin valve element of the third embodiment observed from the side where an external magnetic field enters the device.

As shown in FIG. 10A, the spin valve element of the third embodiment has a structure formed by successively laminating on a ground layer 47, first antiferromagnetic layers 81, ferromagnetic free layers 83, an intermediate non-magnetic layer 85, a ferromagnetic pin layer 87, a magnetization coupling layer 89 for perpendicular cross-coupling, a ferromagnetic layer 91 magnetically coupled almost perpendicular to the ferromagnetic pin layer 87 by the coupled layer 89, a second antiferromagnetic layer 93 exchange coupled to the ferromagnetic layer 91, and a lead electrode 95.

In addition, the first antiferromagnetic layers 81 are exchange coupling to both end portions (oblique line-hatched portions in FIG. 10A) and as the result thereof, a bias magnetic field is applied from the end portions of the ferromagnetic free layers 83 to the central magnetic susceptive region of the ferromagnetic free layers 83, whereby the magnetic susceptive region has the magnetization shown by the arrow in FIG. 10A in the state where a signal magnetic field is zero.

As explained in the first embodiment, in the element, the number of steps for fixing the magnetization of the ferromagnetic pin layer 87 and for heat treatment of the antiferromagnetic layers 81 and 93 used for imparting a bias to the ferromagnetic free layers 83 can be reduced as compared with the prior art.

Figure 10B:
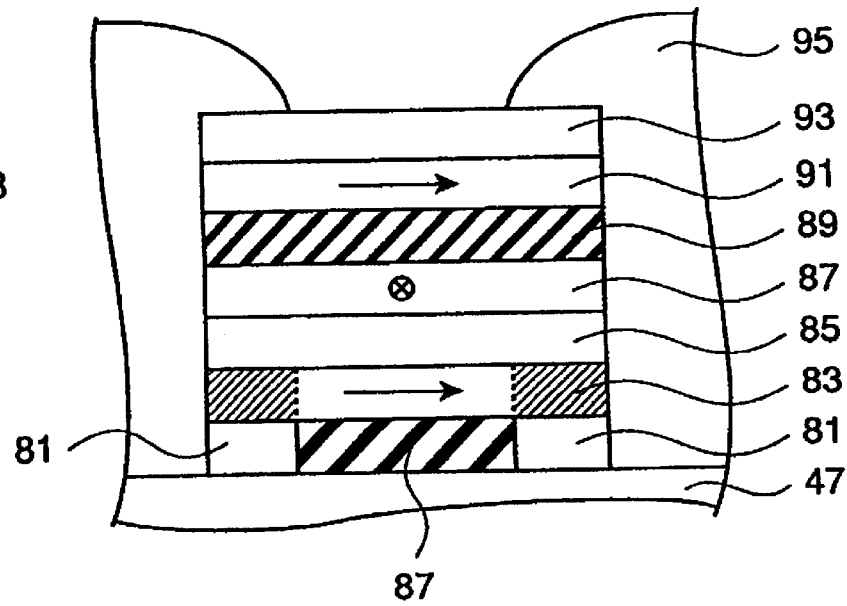

Now, in the third embodiment, the space between the two first antiferromagnetic layers 81 disposed separately is not necessary to be a ferromagnetic free material and a space layer 97 may be used as shown in the cross-sectional view observed from the opposite side to medium of FIG. 10B. For the space layer 97, an insulating substance such as $AlO_x$, $SiO_x$, etc., used for a magnetic device such as a magnetic head, etc., is preferably used for reducing the shunt effect. Also, from the viewpoint of increasing the crystal orientation property of the ferromagnetic free layers 83, Cu, Ru, NiFe, NiFeCr, etc., can be used. Furthermore, in these substances, different magnetic layers may be laminated or a mixed layer of different substances may be used.

The 4th Embodiment

Figure 11:
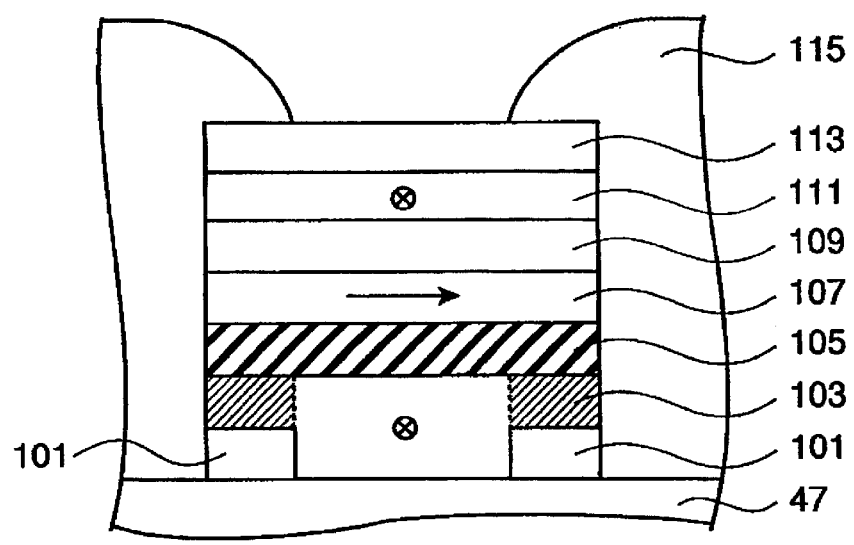
FIG. 11 is a cross-sectional view showing the magnetoresistance effect element of the 4th embodiment of the invention.

FIG. 11 is a cross-sectional view of the spin valve element of the 4th embodiment of the invention observed from the side a signal enters.

As shown in FIG. 11, the spin valve element of the 4th embodiment has two first antiferromagnetic layers 101 formed separated from each other on a ground layer 47, ferromagnetic layers 103 existing on the two first antiferromagnetic layers 101, a magnetization coupling layer 105 magnetically coupling the ferromagnetic layers 103 and a ferromagnetic free layer 107 such that the magnetizations of layers 101 and 107 are perpendicular, an intermediate nonmagnetic layer 109, a ferromagnetic pin layer 111, a second antiferromagnetic layer 113, and lead electrodes 115.

Figure 12:
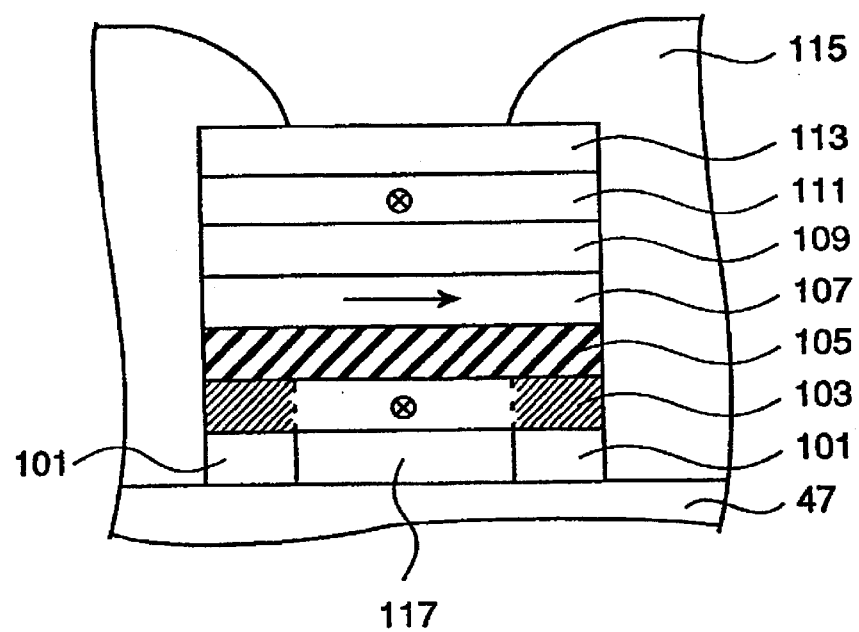
FIG. 12 is a cross-sectional view showing a modified example of the magnetoresistance effect element of the 4th embodiment of the invention.

Also, FIG. 12 is the cross-sectional view of the spin valve element disposing a space layer 117, as explained in the third embodiment, between the first antiferromagnetic layers 101 separated each other in the fourth embodiment observed from the side an external magnetic field is applied. As the space layer 117, the material explained in the third embodiment can be employed.

In FIG. 11 and FIG. 12, in both end portions (oblique line hatched portions of FIG. 10 and FIG. 11) of the ferromagnetic layers 103 laminated on the first antiferromagnetic layers 101, the magnetizations are fixed by exchange coupling with the first antiferromagnetic layers 101, and the central magnetic susceptive region disposed between the end portions has a magnetization in the direction of from the front to the back in the figure from the magnetic bias from both the end portions.

Also, the ferromagnetic pin layer 111 has a magnetization in the direction from the front to the back of the figure from exchange coupling to the antiferromagnetic layer 113 and accordingly, in the embodiment, the number of heat treatment steps necessary for imparting a fixed magnetization to the ferromagnetic pin layer 111 and for imparting a magnetic bias to the ferromagnetic layers 103 can be reduced, and the same effect as explained in other embodiment is obtained.

As described above, the magnetoresistance effect elements of the first to 4th embodiments of the invention and the modified examples are explained by referring to the accompanied drawings.

The materials used for the magnetization coupling layers (interlayer) for perpendicular cross-coupling and the perpendicular cross-coupling in the invention are explained. For the magnetization coupling layer (interlayer), a mixed phase film containing at least two kinds oxides of the same metal each having a different valence number or a laminated film formed by laminating at least two oxide layers of the same metal each having a different valance number can be used. In this case, as the oxides of the same metal each having a different valence number are;

1) selected from FeO, $Fe_3O_4$, $\alpha-Fe_2O_3$, and $\gamma-_2O_3$;
2) selected from CrO, $Cr_2O_3$, $CrO_2$, $Cr_2O_5$, $CrO_3$, and $CrO_5$; and
3) MnO and $MnO_2$.

Also, a layer of one of Au, Al, Ag, Cu, Cr, Mn, etc., or a layer of the mixture thereof can be used as the magnetization-coupling layer, or a laminated film of the single-element layers or mixed element layers may be used.

When each of the unit vectors of the magnetizations of two ferromagnetic layers each composed of ferromagnetic layer/interlayer for perpendicular cross-coupling/ferromagnetic layer, wherein two ferromagnetic layers are laminated via an interlayer for perpendicular cross-coupling is $M_1$ and $M_2$, the coupling energy Ec between the ferromagnetic layers is expressed by the following formula (1);

$$Ec = -A_{12}M_1M_2 - B_{12}(M_1M_2)^2 \quad (1)$$

wherein $A_{12}$ is an ordinary bilinear exchange coupling constant and $B_{12}$ is a biquadratic exchange coupling constant. The coupling of almost 90 degree (perpendicular) occurs when $|A_{12}| < |B_{12}|$ and $B_{12} < 0$.

$B_{12}$ is induced when the antiferromagnetic coupling state of $A_{12} < 0$ and the ferromagnetic coupling state of $A_{12} > 0$ exist as the mixture. On the other hand, because $A_{12}$ oscillates with the increase of the film thickness of the interlayer, when an actual sample has unevenness, a film thickness distribution occurs and as the result thereof, by mixing $A_{12} < 0$ and $A_{12} > 0$, an almost 90 degree coupling occurs. When a surface unevenness of one atom exists on the interlayer at a cycle of 2L and the difference of the bilinear coupling energies by the unevenness is 2 J, the biquadratic constant $B_{12}$ is expressed by the follows formula (2);

$$B_{12} = -|2(J)^2 L/(A^3)|_{n=1}[\coth|(2m-1)(D_1/L)|/(2m-1)^3 + \coth|(2m-1)(D_2/L)|/(2m-1)^3] \quad (2)$$

[Phys. Rev. B 67, 3172(1991)].

In the formula, $D_1$ and $D_2$ represents the film thicknesses of two ferromagnetic layers respectively and A is an exchange stiffness constant specific to the ferromagnetic substance. As is seen from the formula, $B_{12}$ largely depends upon the smoothness and the film thickness of the film. Thus, it is expected that dispersion occur in $B_{12}$ by the conditions used to prepare a sample. By an epitaxial growth, three various layer films each composed of ferromagnetic layer/interlayer for perpendicular cross-coupling/ferromagnetic layer were prepared, and the oriented surfaces and $B_{12}$'s obtained are shown in Table 1 below.

TABLE 1

| Interlayer | Film Construction | Oriented Surface | $B_{12}$ [erg/cm$^2$] |
|---|---|---|---|
| Au | Fe/Au(8 ML)/Fe | (001) | −0.003 |
| Al | Fe(4.6 ML)/Al(1.6 ML)/Fe(4.6 ML) | (001) | −0.036 |
| Ag | Fe(9 ML)/Ag(6 ML)/Fe(16 ML) | (001) | −0.070 |
| Cu | Co(4 ML)/Cu(10 ML)/Co(10 ML) | (001) | −0.015 |
| Cu | Fe(9.4 ML)/Cu(9 ML)/Fe(16 ML) | (001) | −0.10 |
| Cr | Fe/Cr(4 ML)/Fe | (001) | −0.2 |
| Mn | CoFe(10 nm)/Mn(1.12 nm)/CoFe (10 nm) | (001) | −3.0 |

In table 1, ML corresponds a unit of an atomic layer and 1ML denotes a monoatomic layer.

In addition, it is preferred that the film thickness of the interlayer for perpendicular cross-coupling is from about 0.2 nm to 2 nm which is the range of realizing a 90 degree coupling.

Also, as the interlayer for perpendicular cross-coupling in this invention, in addition to the above-described materials, there are considered metal oxides, metal nitrides, and metal fluorides of the metals.

In these materials, in the case of using materials containing a metal differing in polarity by the valance number, by controlling the progress of oxidation, nitridation, or fluoridation, a mixed phase state of a ferromagnetic phase, an antiferromagnetic phase, and a ferrimagnetic phase can be realized.

For example, there are Fe oxides (FeO, $Fe_3O_4$, $\alpha$—$Fe_2O_3$, and $\gamma$—$Fe_2O_3$), or the mixed phase film of the oxides or the laminate film of layers of the oxides. The thickness of the perpendicular cross-coupling inter layer of the oxides is from about 0.2 nm to about 10 nm, and preferably from about 0.5 nm to about 3 nm. By the measurements in Examples 1 to 4 relating to the spin valve films using the Fe oxides as the interlayer for perpendicular cross-binding, it was confirmed that the Fe oxides coupled the magnetization of the adjacent ferromagnetic layer, and also the coupling energy was measured as follows.

In Examples 1 to 4, films were successively formed on thermally oxidized Si using DC magnetron sputtering. Thereafter, while applying a magnetic field of 7 kOe in vacuum, thermally oxidized Si was heat-treated for one hour at a reduced temperature of 270 C. Thereby, the magnetization of CoFe was fixed by the exchange coupling energy Jua=HuaMst 0.14 erg/cm² of the CoFe interface of each example. Wherein, Hua is an exchange coupling magnetic field (in the case, 500 Oe), Ms is the saturated magnetization of the pin layer (1.8T), and t is the thickness of the pin layer (2 nm). The layer construction of each example is shown in Table 2. In each example, the layers were successively formed on a thermally oxidized Si substrate from left side of the Table 2 by the method described above.

TABLE 2

Spin valve in the case of using Fe oxide as the first interlayer for right angle-cross coupling

| | |
|---|---|
| Example 1 | Ta(5 nm)/NiFe(2 nm)/IrMn(7 nm)/CoFe(A) (2 nm)/Fe(2 nm)/spontaneous oxidation (12000 Langmuiers)/ CoFe(B)(2 nm)/Cu(2 nm)/CoFe(C)(2 nm)/Cu(1 nm)/ Ta(0.4 nm) |
| Example 2 | Ta(5 nm)/NiFe(2 nm)/IrMn(7 nm)/CoFe(2 nm)/Fe(2 nm)/ spontaneous oxidation (600 to 12000 Langmuiers)/ CoFe(2 nm)/Cu(2 nm)/CoFe(2 nm)/Cu(1 nm)/Ta(0.4 nm) |
| Example 3 | Ta(5 nm)/NiFe(2 nm)/IrMn(7 nm)/CoFe(1 or 2 nm)/Fe(1 or 2 nm)/spontaneous oxidation (3000 Langmuiers)/ CoFe(2 nm)/Cu(2 nm)/CoFe(2 nm)/Cu(1 nm)/Ta(0.4 nm) |
| Example 4 | Ta(5 nm)/NiFe(2 nm)/IrMn(7 nm)/CoFe(2 nm)/Fe(1 to 4 nm)/spontaneous oxidation (3000 or 12000 Langmuiers)/ CoFe(2 nm)/Cu(2 nm)/CoFe(2 nm)/Cu(1 nm)/Ta(0.4 nm) |

Example 5 is a spin valve in the case of using Cr oxide as the first interlayer for perpendicular cross-coupling

| | |
|---|---|
| Example 5 | Ta(5 nm)/Ru(2 nm)/PtMn(10 nm)/CoFe(2 nm)/Ru(1 nm)/ CoFe(1 nm)/Cr(0 to 0.7 nm)/spontaneous oxidization(300 Langmuiers)/CoFe(2 nm)/Cu(2 nm)/CoFe(2 nm)/Cu(1 nm)/ spontaneous oxidation (300 Langmuiers)/Ta(0.4 nm) |

(Note 1): In Examples 1 to 5, the stoichiometric composition of NiFe is Ni80%Fe20%, the stoichiometric composition of CoFe is Co90%Fe10%, and the stoichiometric composition of IrMn is Ir22%Mn78%.

(Note 2): The upper surface of Examples 1 to 4 is a Cu—Ta oxide. In the above table, Langmuiers is the unit of oxidation strength and indicates the amount of an oxide formed by exposure to an atmosphere of an oxygen partial pressure of $1 \times 10^{-6}$ Torr for one second.

Figure 13:
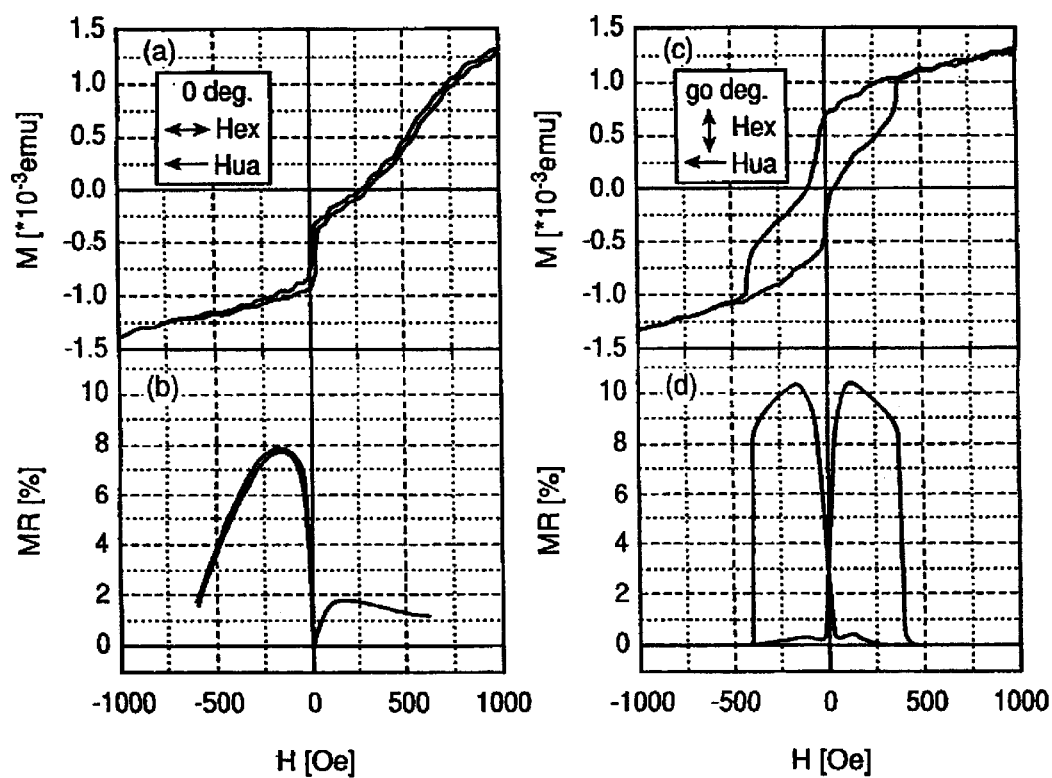
FIG. 13 is a graph showing the magnetization curve and the MR curve of Example 1.

The magnetization curve and the MR curve of Example 1 using an Fe oxide for the interlayer for perpendicular cross-coupling are shown in FIG. 13A, C and FIG. 13B, D respectively. The magnetization curve and the MR curve in the case of introducing an external magnetic field (Hex) parallel to the exchange bias magnetic field direction (Hua) from the IrMn antiferromagnetic layer are FIG. 13A, C, and the magnetization curve and the MR curve in the case of introducing perpendicularly are FIG. 13B, D. When Hua is parallel to Hex, the MR changing rate of a little lower than 8% was shown, and when Hua is perpendicular to Hex, the MR changing rate of a little higher than 10% was shown. When the magnetizations of the CoFe ferromagnetic free layer and the CoFe ferromagnetic pin layer holding between them a Cu intermediate non-magnetic layer become completely anti-parallel is realized, MR reaches its maximum value. In the case of a parallel insertion, the magnetizations of the free layer and the pin layer do not become completely anti-parallel and in the case of a perpendicular insertion, anti-parallel is realized. That is, the magnetization of the CoFe ferromagnetic layer, the magnetization of which is fixed by the exchange bias magnetic field from IrMn, and the magnetization of the CoFe ferromagnetic pin layers holding between them an interlayer for perpendicular cross-coupling made of the ferromagnetic layer and an Fe Oxide are almost in a perpendicular magnetization direction.

Now, in Example 1, when an external magnetic field was applied, the magnetizations of the CoFe ferromagnetic pin layer and the CoFe free layer became no longer anti-parallel at a magnetic field of about 380 Oe. This means that the magnetic coupling energy by an Fe oxide is at least 0.11 erg/cm².

In Example 2, the oxidation strength in the spontaneous oxidation of the interlayer for right angle-cross coupling was changed.

Figure 14:
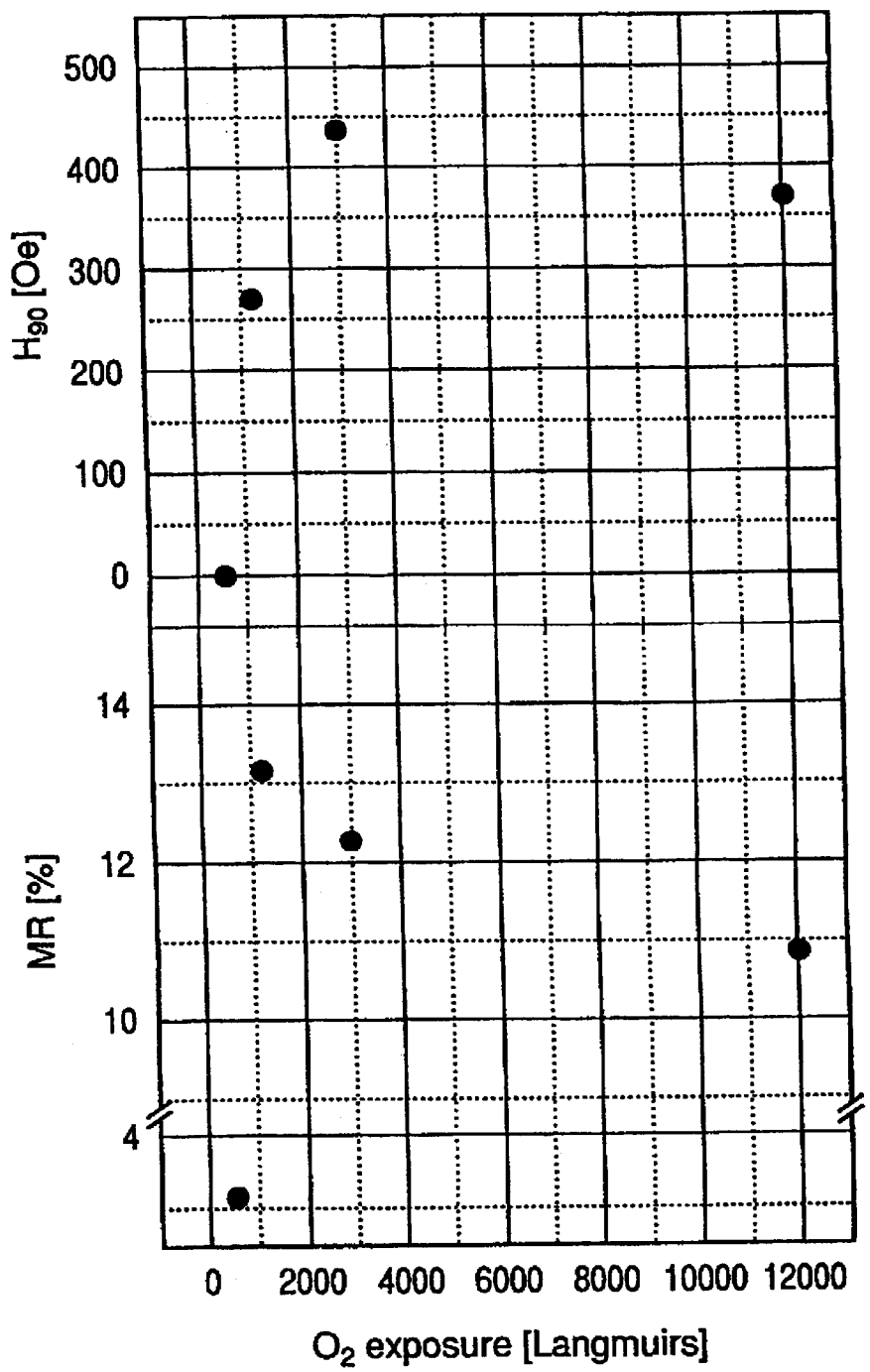
FIG. 14 is a view showing the oxidative strength dependence of a magnetic field $H_{90}$ and MR breaking the anti-parallel state of Example 2.

FIG. 14 shows the oxidation strength dependence of the magnetic field $H_{90}$ of breaking the anti-parallel state and the electric magnetoresistance amplitude in the case of perpendicularly inserting a magnetic field. At 600 Langmuiers, the Fe oxide necessary for coupling at 90 degrees has not been obtained, and at 1200 Langmuiers or higher, the 90-degree coupling is realized.

Also, when the interlayer for perpendicular cross-coupling is an insulating material, an MR increasing effect by electron deflection is obtained. It is considered that Cu and Ta form a Cu—Ta oxide by self oxidization and because at the interface between the Cu—Ta oxide and the CoFe ferromagnetic free layer and the interface between the Fe oxide and the ferromagnetic pin layer, a mirror reflection of conductive electrons occurs, in the spin valve without an Fe oxide, almost 10% is the maximum value of MR, while in the 1200 Langmuiers of Example 2 using an Fe oxide, MR of 13% was obtained. However, The strength of the oxidation is increased over 1200 Langmuiers, the film surface is roughened, whereby MR is reduced gradually.

Accordingly, for obtaining both stabile magnetic coupling and high MR, the oxidation strength of from 1000 Langmuiers to 8000 Langmuiers is suitable.

In Example 3, the thicknesses of the IrMn antiferromagnetic layer and the interlayer for perpendicular cross-coupling made of a Fe oxide was investigated. The results thereof are shown in Table 3.

TABLE 3

The change of $H_{90}$ and $MR_{90}$ by (the CoFe film thickness between IrMn and Fe oxide, the Fe film thickness before oxidation)

| (CoFe, Fe) | $H_{90}$ [Oe] | $MR_{90}$ [%] |
|---|---|---|
| (1 nm, 1 nm) | 220 | 14.7 |
| (1 nm, 2 nm) | 185 | 6.21 |

TABLE 3-continued

The change of $H_{90}$ and $MR_{90}$ by (the CoFe film thickness between IrMn and Fe oxide, the Fe film thickness before oxidation)

| (CoFe, Fe) | $H_{90}$ [Oe] | $MR_{90}$, [%] |
|---|---|---|
| (2 nm, 1 nm) | 241 | 7.94 |
| (2 nm, 2 nm) | 444 | 12.3 |

From the results shown in the table, it can be seen that to realize the good magnetic coupling, the film thickness of the CoFe ferromagnetic layer held between the IrMn antiferromagnetic layer and the Fe oxide interlayer must be at least 1 nm, and desirably at least 2 nm. However, because the film thickness should is too thick, the magnetization (Ms t product) is increased and Hua is lowered, the film thickness should be between 2 nm and 3 nm.

Figure 15:
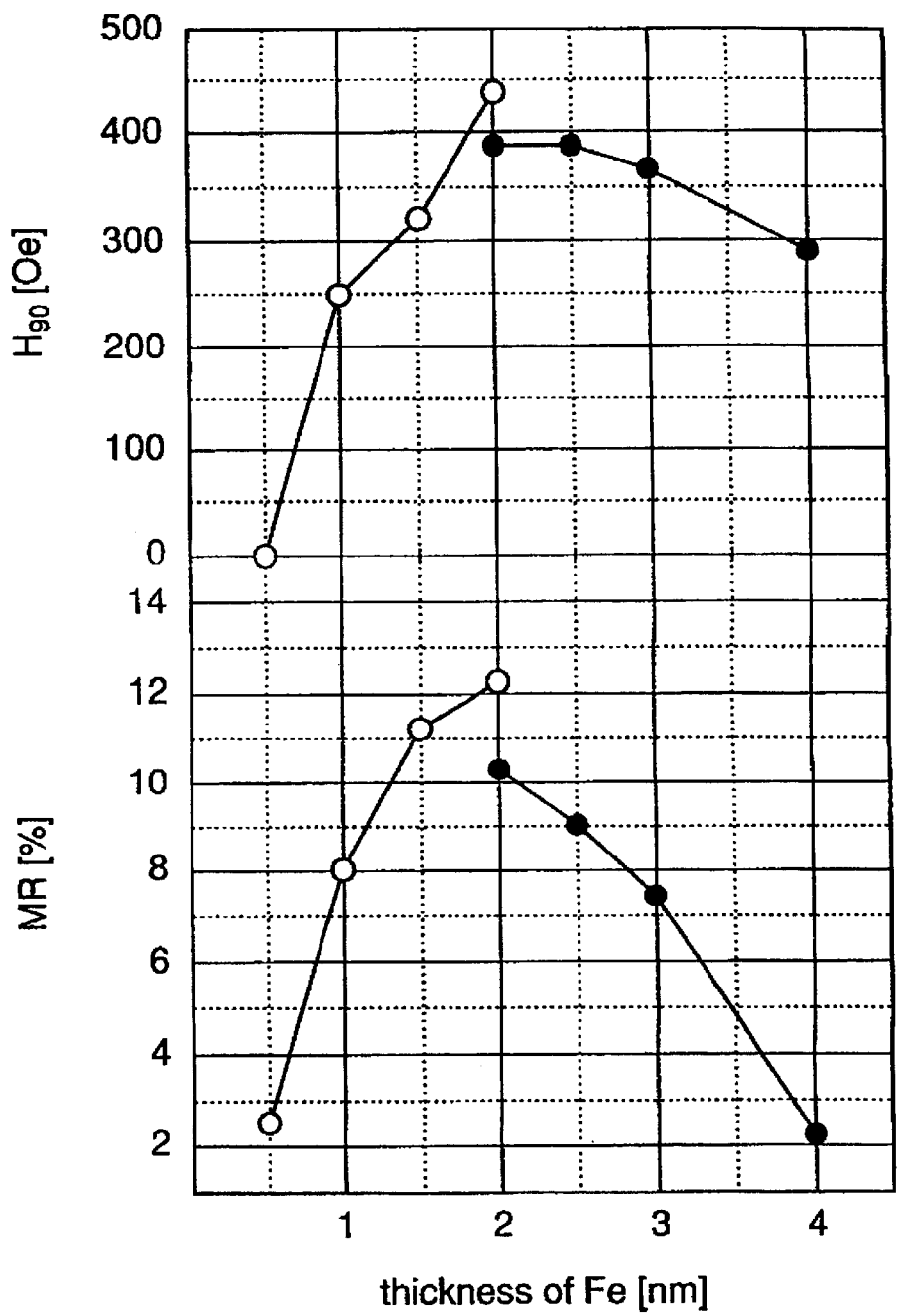
FIG. 15 is a view showing the film-thickness dependence of Fe before oxidizing relating to a magnetic field $H_{90}$ and MR breaking the anti-parallel state of Example 4.

In Example 4, the film thickness of Fe of the interlayer for perpendicular cross-coupling before oxidization was varied. In this case, the oxidation strength was 3000 Langmuiers when the film thickness of Fe was not thicker than 2 nm and was 12000 Langmuiers when the film thickness was 2 nm or thicker. The reason the oxidation strength varies according to the film thickness of Fe is that when the Fe film is thick, the film is oxidized to a deep layer portion, but as described above, in the region of the strong oxidation, the film surface was roughened and MR was lowered. In FIG. 15, a relation of the Fe film thickness, the perpendicular cross-coupling magnetic field $H_{90}$, and the magnetoresistance amplitude is shown. From the results, it can be said that the film thickness of Fe is preferably from 1 nm to 3 nm, and particularly desirably from 1.5 nm to 2 nm.

Figure 16:
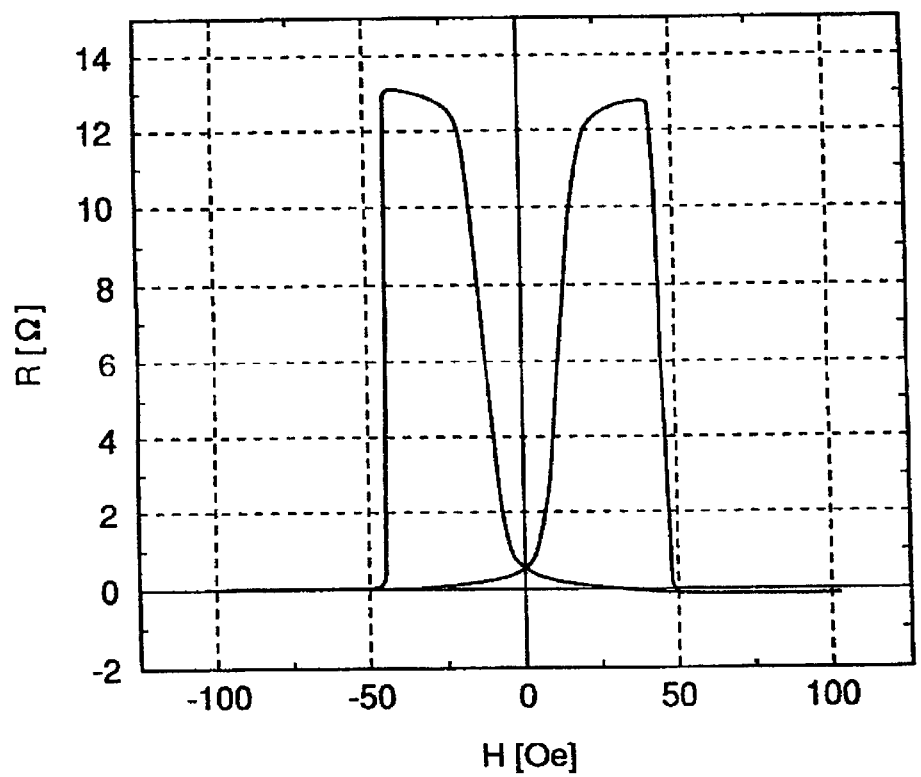
FIG. 16 is a graph showing the MR curve of Example 5.

Also, in Example 5, the MR curve of a spin valve using Cr as the interlayer for right angle-cross coupling by spontaneously oxidizing the Cr is shown in FIG. 16. The 90-degree coupling magnetic field is smaller than the case of Fe but the layer is coupled at about 50 Oe (in this case, 0.014 erg/cm$^2$).

In these descriptions, Examples 1 to 5 of spontaneously oxidizing Fe or Cr by the introduction of oxygen into the film-forming chamber were shown but in addition of Fe and Cr, Mn can be used. As the method of the oxidation, there are (1) an oxidation by an oxygen radical formed by plasma, (2) an oxidation of an oxygen radical formed by irradiating ultraviolet rays from an excimer lamp, (3) reactive sputtering of Fe, Cr, or Mn in an environment containing oxygen, etc. The oxidation (1) is suitable for preparing a precise and thin oxidation film and in this case, the valence number of Fe, Cr, and Mn can be easily controlled. The oxidation (2) produces less damage by oxygen ions in addition to the merits of the oxidation (1), and a smooth interface can be formed, whereby the effect of the electron mirror reflection is increased and the output can be improved. In oxidation (3), a chemically stabilized oxidation film is obtained, and a stable action as an element can be continued. Furthermore, when the oxidations (1) to (3) are conducted while heating a substrate to a temperature of from 40 C. to 100 C., smooth oxides can be obtained and in a chemically stabilized state. Also, when oxidations (1) and (2) are carried out by cooling a substrate to a temperature of from 77K to 295K, disassociation of the oxygen molecule and spontaneous oxidization can be restrained, whereby the contribution of the oxygen radical is increased and a precise and thin oxidation film can be formed.

Also, in the above-described cases, thermally oxidized Si was used as the substrate, but for the purpose of improving the flatness, a sapphire substrate, an MgO substrate, a GaAs substrate, or an Si substrate can be used. Furthermore, as the soft magnetic characteristics ground of the free layer as the noise-reducing counterplane for the element, a metal having an fcc structure, such as, for example, a single layer film of Ru, Cu, Au, or NiFeCr or the laminated film or a mixed phase film may be used in place of NiFe.

Now, for inserting the interlayer for perpendicular cross-coupling between the ferromagnetic free layer and the antiferromagnetic layer, it is possible to improve the susceptibility as a spin valve. Because when the two ferromagnetic layers holding between them the interlayer for perpendicular coupling have the same magnetization (Ms t product), the magnetization of the whole ferromagnetic free layers is oriented 45 degrees to the magnetization direction of the ferromagnetic pin layer, when an external magnetic field from a recording medium is applied, there is a possibility that the magnetization is hard to rotate.

For preventing the occurrence of such a problem, the Ms t products are made to differ such that the magnetizations as the sum total of those of the two ferromagnetic layers via the interlayer for perpendicular cross-coupling is almost perpendicular to the magnetization of the ferromagnetic pin layer. When the ratio of the Ms t product of the ferromagnetic free layer to that of the ferromagnetic layer adjacent to the antiferromagnetic layer is set to about 1:5, the angle between the magnetization of the ferromagnetic pin layer and the magnetizations of both the ferromagnetic layers via the interlayer for perpendicular cross-coupling becomes about 80 degrees and the deterioration of the susceptibility can be restrained. Also, there is a method of weakening the perpendicular cross-coupling. The magnetization of the ferromagnetic layer adjacent to the antiferromagnetic layer is fixed, and only the magnetization of the ferromagnetic free layer is rotated. In this case, as the susceptibility, it is preferred that the external magnetic field by which the magnetization of the ferromagnetic free layer begins to rotate is not higher than 5 Oe. For example, when the magnetization of the ferromagnetic free layer is 3.6 nmT, it is necessary that the perpendicular cross-coupling energy is $1.4 \times 10^{-3}$ erg/cm$^2$ or lower.

The magnetoresistance effect element using the magnetization coupling layers (inserted layers) coupling at about a right angle can be used as a reproducing head of a magnetic reproducing apparatus such as a magnetic disk apparatus, etc.

In magnetic reproducing heads, the shield-type magnetic head that has hitherto been used has the above-described magnetoresistance effect element in vicinity of the opposite surface to a medium of the head.

Also, in addition to the shield-type magnetic head, the invention can be applied to a yoke-type magnetic head shown as the schematic slant view thereof in FIG. 17. As shown in FIG. 17, the yoke-type magnetic head has a pair of yokes 1204 to introduce a signal magnetic field from a recording track 1202 on a recording medium in the surface 1200 opposite to a medium to the magnetoresistance effect element dispose n the head. Practically, a recording medium is rotated in a plane and the magnetic head is relatively moved on the surface thereof via air or in contact therewith.

In FIG. 17, an arrow added in the pair of the yokes shows the entering direction of a signal magnetic field. The signal magnetic field is introduced to the magnetoresistance effect element 1210 of the invention by one of the yokes 1204, and returns to the medium by the other one of the yokes 1204 to constitute one magnetic circuit. The magnetoresistance effect element 1210 consists of the magnetoresistance effect film 1206 and a pair of lead electrodes 1208 connected to both ends of the magnetoresistance effect film 1206. The dotted-line arrow added to the magnetoresistance effect film 1206 and the lead electrodes shows the direction of a sense electric current.

In the case of using such yokes 1204, to efficiently introduce a magnetic flux to the magnetoresistance effect film 1206, it is desirable that the permeability of the yoke 1204 is high, and it is desirable that the yoke does not have a uniform magnetic anisotropy. However, because the heat treatment for the spin valve is carried out after forming the laminated of the spin valve on the yoke 1204, there is a possibility that by the heat treatment to the spin valve, the yoke portion has a uniform anisotropy. Accordingly, it can be said to be a large merit for the yoke-type magnetic head that the heat treatment is finished by a light treatment as the magnetoresistance effect element of the invention. In addition, the yoke-type magnetic head is not limited to the structure shown in FIG. 17 but the same effect is also obtained in a structure that the magnetoresistance effect element is disposed at a position away from the surface opposing the medium, and the magnetic yoke is disposed between the opposing surface and the magnetoresistance effect element.

Also, for the sake of design, the yoke-type magnetic head has a construction that the lead electrodes 1208 are disposed in the x-direction as shown in FIG. 17. This is same as a structure that the principal surface 1206 of the magnetoresistance effect film is formed perpendicular to the magnetic medium 1202 or a structure that the principal surface of the magnetoresistance effect film is formed at the back portion of the yoke 1204 and is formed in parallel to the magnetic medium 1202 as shown in FIG. 17.

The stream of the magnetic flux in the magnetoresistance effect film is in the x-direction as shown by the solid arrow in FIG. 17. That is, the sense electric current becomes parallel to or anti-parallel to the direction of the magnetic flux entering the ferromagnetic free layer 7. In such a circumstance, when a spin valve of the prior art that does not use almost perpendicular crossing is mounted, an antiferromagnetic layer 9 of magnetic bias impartation (magnetic domain control) of the ferromagnetic free layer 7 is disposed such that it does not face the z-direction in FIG. 18B. That is, a shunt electric current passes to a magnetic field dead domain by which a magnetic domain controlling antiferromagnetic layer is in contact with the free layer and the output is lowered.

Figure 18A:
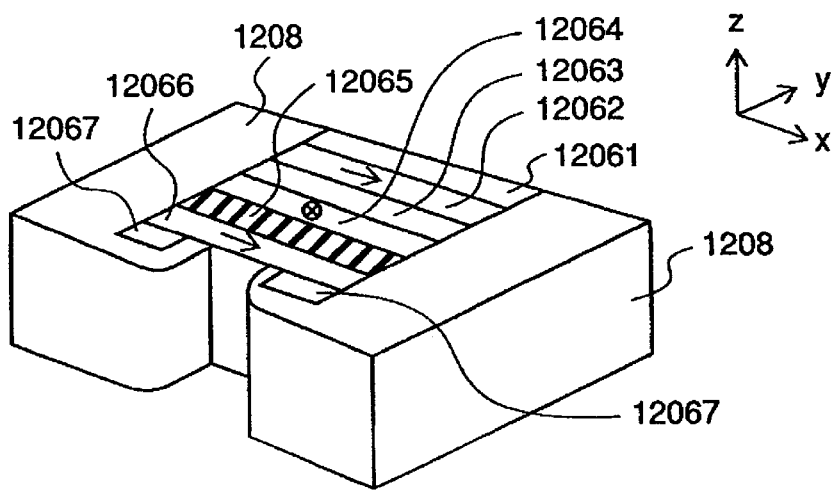
FIGS. 18A and 18B are slant views showing a relation of each layer of the magnetoresistance effect element and the yoke in a yoke-type magnetic head.
Figure 18B:
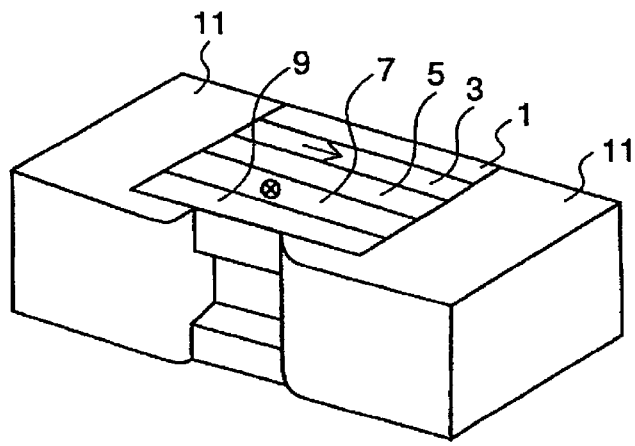

On the other hand, when the spin valve element using a magnetization coupling layer (inserted layer) of almost perpendicular cross-coupling is mounted, as shown in FIG. 18A, antiferromagnetic layers 12067 are disposed opposing each other in the x-direction, and by extending the lead electrodes 1208 to the central active region over the antiferromagnetic layers 12067, the magnetic field dead region can be bypassed. From the above description, by combining the yoke-type magnetic head and the spin valve element using the magnetization coupling layer (inserted layer) 12065 for almost perpendicular cross-coupling, the output can be improved.

Figure 19:
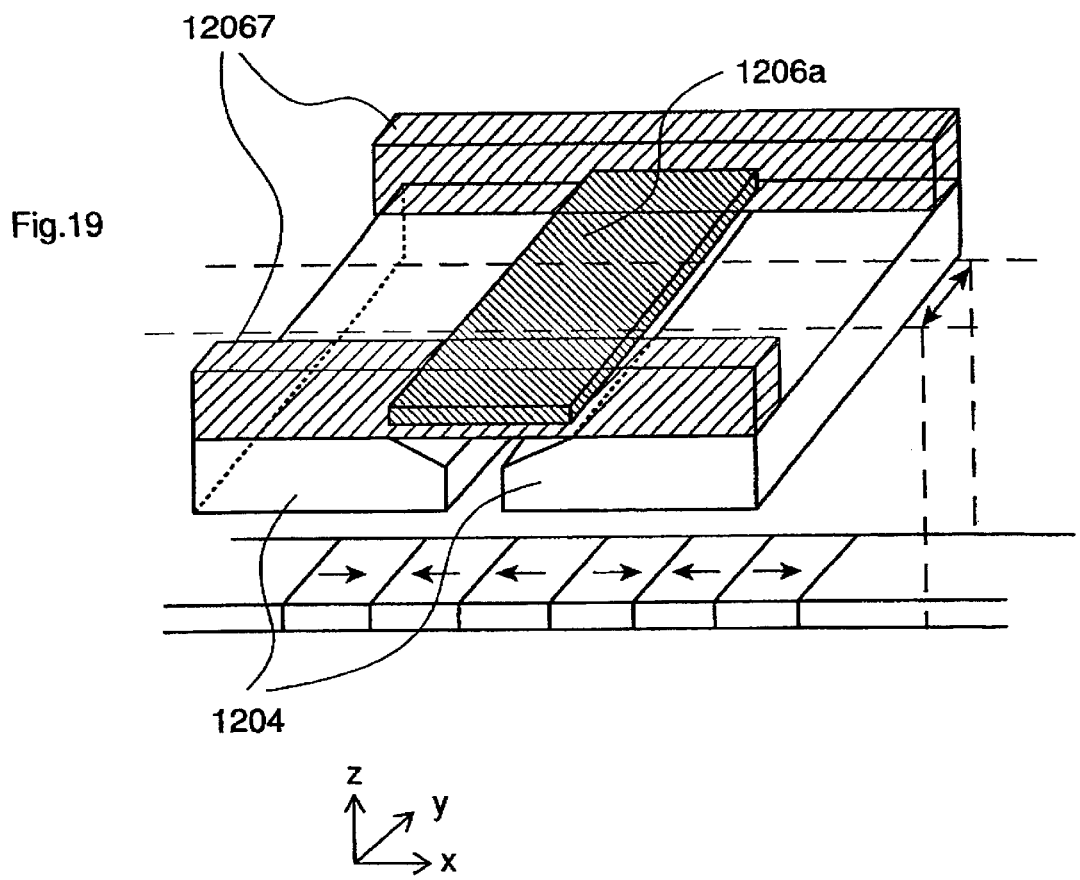
FIG. 19 is a schematic slant view showing other embodiment of a yoke-type magnetic head.

Also, as shown in FIG. 19 which shows a schematic slant view of the yoke-type magnetic head, when the principal surface (the surface perpendicular to the laminated direction of the films) is disposed parallel to the principal surface of a magnetic recording medium 1202, and a pair of hard magnetic material layers or antiferromagnetic layers 12067 are disposed to hold the magnetoresistance effect film 1206a and hold the track width-forming portion above the track of the recording medium between them, the magnetizations of the yokes 1204 can be arranged in the y-direction. Thereby, the permeability of the yokes in the x-direction becomes uniform and small and the signal magnetic flux from the recording medium 1202 efficiently enters the free layer. In this case, it is necessary that the magnetization of the pin layer of the magnetoresistance effect film 1206a be fixed in the same direction(x-direction) as the magnetizations of the yokes and the free layer. That is, the heat treatment for magnetization fixing of the pin layer and the heat treatment for the magnetization fixing of the yokes 1204 become necessary. In this case, by inserting the straight-direction coupling film in the pin layer or the free layer, the heat treatment for the yokes 1204 and the pin layer can be simultaneously carried out, whereby the number of the production steps can be reduced. In addition, for the magnetoresistance effect film 1206a of FIG. 19, the magnetoresistance effect film explained in each of the embodiments of the invention can be used and hence, the detailed explanation thereof is omitted. In addition, in the yoke-type head as shown in FIG. 19, as the magnetoresistance effect element, a GMR element passing an electric current perpendicular to the principal surface (CPP system) is suitable. In this case, a pair of electrodes is disposed as holding the magnetoresistance effect film from the upper and lower sides.

Figure 20:
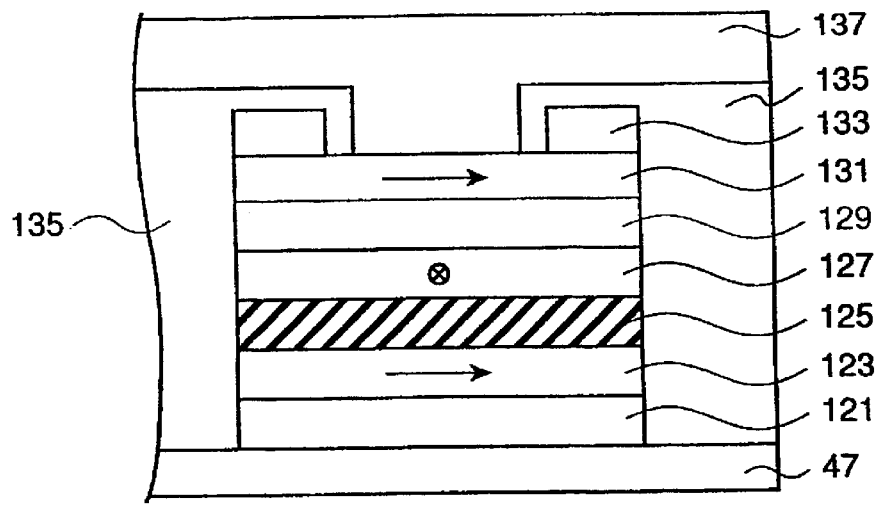
FIG. 20 is a cross-sectional view showing an embodiment of the tunnel effect element of the invention.

The film structure using the materials perpendicularly coupled described above can be applied not only to the spin valve but also to a so-called dual spin valve element doubly having an artificial lattice film and the spin valve structure, and further the film structure can be also applied to a tunnel magnetoresistance effect film using a tunnel effect and to a CPP (Current Perpendicular to Plane) magnetoresistance effect element wherein the sense electric current passes in a direction perpendicular to the film surface of the magnetoresistance effect film. The cross-sectional view of an example is shown in FIG. 20.

The tunnel magnetoresistance effect element has a first antiferromagnetic layer 121 on the surface of a ground layer 47 which serves a lower electrode, a ferromagnetic layer 123, a magnetization coupling layer 125 for perpendicular cross-coupling, a ferromagnetic pin layer 127, a non-magnetic tunnel insulating layer 129, a ferromagnetic free layer 131, a second antiferromagnetic layer 133, an insulating layer 135 surrounding the side walls of the tunnel magnetoresistance effect film, and an upper electrode layer 137. A tunnel electric current passes between the upper and lower electrodes. By the relative changes of the magnetization directions of the ferromagnetic pin layer 127 and the ferromagnetic free layer 131, a tunnel resistance is changed. From this information, the direction of the external magnetic field can be detected. In addition, such a tunnel magnetoresistance effect film can be applied not only to a so-called magnetic sensor such as a magnetic head, etc., but also to a nonvolatile magnetic random access memory (MRAM) obtained by constructing a cell with a diode and a transistor on a substrate and integrating plural sets of the cells.

The magnetic head assembly using the magnetoresistance effect element as described above for a magnetic reproducing head and mounting the magnetic reproducing head thereon has the following construction.

An actuator arm has a hole for being fixed to the fixing axis in a magnetic disk apparatus and a suspension is connected to one end of the actuator arm.

To the tip of the suspension is fixed a head slider mounting thereon a magnetic head equipped with the magnetoresistance effect element described in each embodiment and example described above. Also, the suspension was wired with a lead wire for writing and reading signals, one end of the lead wire is electrically connected to each electrode of the magnetoresistance effect head incorporated in the head slider, and the other end of the lead wire is connected to an electrode pad.

Also, the inside structure of a magnetic disk apparatus mounted thereon the magnetic head assembly, which is one kind of the magnetic recording apparatus of the invention, is described below.

A magnetic disk is fitted to a spindle and is rotated by a motor responding to a control signal from a driving apparatus-controlling portion. The head slider for carrying out recording and reproducing of information in the state that the magnetic disk is floated is fixed to the tip of a thin-film form suspension. In this case, the head slider is equipped with the above-described magnetoresistance effect reproducing head.

When the magnetic disk is rotated, the surface of the head slider opposing the medium is maintained in the state of floating at a definite distance from the surface of the magnetic disk.

The suspension is connected to one end of the actuator arm having a bobbin portion, etc., holding a driving coil. To the other end of the actuator arm is formed a voice coil motor which is a kind of a linear motor. The voice coil motor is constructed of the driving coil wound up on the bobbin portion of the actuator arm, permanent magnets disposed facing each other holding the coil between them, and a magnetic circuit made of the opposing yokes. The actuator arm is held by ball bearings formed at the two upper and lower positions of the fixed axis and can be freely rotated and slid by the voice coil motor.

The invention is not limited to the materials of the layers illustrated in the embodiments and examples of the invention described above.

Also, depending upon the film-forming methods of layers, etc., such as the sputtering pressure and the sputtering temperature of the sputtering steps, and the processing temperature, the processing atmosphere, and the processing time of the heat treatment steps after the film formation, it can be easily anticipated that a diffusion of atoms from an adjacent layer or a separated layer occurs. Accordingly, by the control, etc., of these production methods, when films are formed using the illustrated targets, the layers containing a different material are formed as the result of the diffusion of atoms as described above. However even when such a diffusion occurs, when the characteristics (ferromagnetism, antiferromagnetism, almost perpendicular magnetic coupling spin depending scattering, etc.) based on the import of the present invention are obtained, the effect of the invention can be sufficiently obtained.

As described above in detail, according to the present invention, the magnetoresistance effect element having a high performance can be provided at a low cost. Also, the element having a thin film can be provided and the element is suitable for a magnetic reproducing system such as a magnetic reproducing head requiring a narrow gap, a hard disk drive, etc.

What is claimed is:

1. A magnetoresistance effect element comprising:
   a first ferromagnetic layer having a magnetization of a first direction,
   a magnetization-coupling layer formed on the first ferromagnetic layer,
   a second ferromagnetic layer formed on the magnetization-coupling layer, perpendicularly magnetic coupled with the first ferromagnetic layer by the magnetization-coupling layer, and having a magnetization of a direction substantially perpendicular to the first direction by the perpendicular magnetic coupling,
   a non-magnetic layer, and
   a third ferromagnetic layer formed on the non-magnetic layer and having a magnetization substantially parallel to the first direction at zero magnetic field.

2. The magnetoresistance effect element according to claim 1, further comprising a first antiferromagnetic layer and a second antiferromagnetic layer, the first magnetic layer disposed on the first ferromagnetic layer and exchange coupled with the first ferromagnetic layer, and the second ferromagnetic layer formed on the third ferromagnetic layer and exchange coupled with the third ferromagnetic layer.

3. The magnetoresistance effect element according to claim 1, wherein the magnetization-coupling layer has a mixed phase layer containing two kinds of oxides of a same metal each having a different valence number, or a laminated film containing two oxide layers of a same metal each having a different valence number.

4. The magnetoresistance effect element according to claim 3, wherein the oxides are selected from a group consisting of FeO, $Fe_3O_4$, $\alpha$—$Fe_2O_3$, and $\gamma$—$Fe_2O_3$.

5. The magnetoresistance effect element according to claim 3, wherein the oxides are selected from a group consisting of CrO, $Cr_2O_3$, $CrO_2$, $Cr_2O_5$, $CrO_3$, and $CrO_5$.

6. The magnetoresistance effect element according to claim 3, wherein the oxides are MnO and $MnO_2$.

7. The magnetoresistance effect element according to claim 1, wherein the second ferromagnetic layer is a magnetization free layer whose magnetization is substantially free to rotate in a signal magnetic field, and the third ferromagnetic layer is a magnetization fixed layer whose magnetization is substantially fixed in the signal magnetic field.

8. The magnetoresistance effect element according to claim 1, wherein the third ferromagnetic layer is a magnetization free layer whose magnetization is substantially free to rotate in a signal magnetic field, and the second ferromagnetic layer is a magnetization fixed layer whose magnetization is substantially fixed in the signal magnetic field.

9. A magnetoresistance effect element, comprising:
   a first ferromagnetic layer having the magnetization of a first direction,
   an insertion layer formed on the first ferromagnetic layer and having a mixed phase film containing two kinds of oxides of a same metal each having a different valence number, or a laminated film having two oxide layers of a same metal each having a different valence number,
   a second ferromagnetic layer formed on the insertion layer and having a magnetization of a direction substantially perpendicular to the first direction, a non-magnetic layer, and
   a third ferromagnetic layer formed on the non-magnetic layer and having a magnetization of a direction substantially parallel to the first direction at zero magnetic field.

10. The magnetoresistance effect element according to claim 9, further comprising a first antiferromagnetic layer and a second antiferromagnetic layer, the first antiferromagnetic layer disposed on the first ferromagnetic layer and exchange coupled with the first ferromagnetic layer, and the second antiferromagnetic layer disposed on the third ferromagnetic layer and exchange coupled with the third ferromagnetic layer.

11. The magnetoresistance effect element according to claim 9, wherein the oxides are selected from a group consisting of FeO, $Fe_3O_4$, $\alpha$—$Fe_2O_3$, and $\gamma$—$Fe_2O_3$.

12. The magnetoresistance effect element according to claim 9, wherein the oxides are selected from a group consisting of CrO, $Cr_2O_3$, $CrO_2$, $Cr_2O_5$, $CrO_3$, and $CrO_5$.

13. The magnetoresistance effect element according to claim 9, wherein the oxides are MnO and $MnO_2$.

14. The magnetoresistance effect element according to claim 9, wherein the second ferromagnetic layer is a magnetization free layer whose magnetization is substantially free to rotate in a signal magnetic field, and the third ferromagnetic layer is a magnetization fixed layer whose magnetization is substantially fixed in the signal magnetic field.

15. The magnetoresistance effect element according to claim 9, wherein the third ferromagnetic layer is a magnetization free layer whose magnetization is substantially free to rotate in a signal magnetic field and the second ferromagnetic layer is a magnetization fixed layer whose magnetization is substantially fixed in the signal magnetic field.

16. A magnetoresistance effect head, comprising:
    a first ferromagnetic layer having a magnetization of a first direction,
    a magnetization-coupling layer formed on the first ferromagnetic layer,
    a second ferromagnetic layer formed on the magnetization-coupling layer, perpendicularly magnetic coupled with the first ferromagnetic layer by the magnetization-coupling layer, and having a magnetization of a direction substantially perpendicular to the first direction,
    a non-magnetic layer, and
    a third ferromagnetic layer formed on the non-magnetic layer and having a magnetization of a direction substantially parallel to the first direction at zero magnetic field.

17. The magnetoresistance effect head according to claim 16, further comprising a first antiferromagnetic layer and a second antiferromagnetic layer, the first antiferromagnetic layer formed on the first ferromagnetic layer and exchange coupled with the first ferromagnetic layer, and the second antiferromagnetic layer formed on the third ferromagnetic layer and exchange coupled with the third ferromagnetic layer.

18. The magnetoresistance effect head according to claim 16, wherein the magnetization coupling layer has a mixed phase film containing two kinds of oxides of a same metal each having a different valence number or a laminated film containing two oxide layers of a same metal each having a different valence number.

19. The magnetoresistance effect head according to claim 18, wherein the oxides are selected from a group consisting of FeO, $Fe_3O_4$, $\alpha$—$Fe_2O_3$, and $\gamma$—$Fe_2O_3$.

20. The magnetoresistance effect head according to claim 18, wherein the oxides are selected from a group consisting of CrO, $Cr_2O_3$, $CrO_2$, $Cr_2O_5$, $CrO_3$, and $CrO_5$.

21. The magnetoresistance effect head according to claim 18, wherein the oxides are MnO and $MnO_2$.

22. The magnetoresistance effect head according to claim 16, wherein the second ferromagnetic layer is a magnetization free layer whose magnetization is substantially free to rotate in a signal magnetic field and the third ferromagnetic layer is a magnetization fixed layer whose magnetization is substantially fixed in the signal magnetic field.

23. The magnetoresistance effect head according to claim 16, wherein the third ferromagnetic layer is a magnetization free layer whose magnetization is free to rotate in a signal magnetic field and the second ferromagnetic layer is a magnetization fixed layer whose magnetization is substantially fixed in the signal magnetic field.

24. The magnetoresistance effect head according to claim 16, wherein the magnetoresistance effect element is disposed apart from a medium facing surface, and further comprising magnetic yokes, the magnetic yokes extending from the medium facing surface to the magnetoresistance effect element and providing signal magnetic field from the medium facing surface to the magnetoresistance effect element.

25. A magnetoresistance effect head, comprising:
    a first ferromagnetic layer having the magnetization of a first direction,
    an insertion layer formed on the first ferromagnetic layer and having a mixed phase film containing two kinds of oxides of a same metal each having a different valence number, or a laminated film formed by laminating two oxide layers of a same metal each having a different valence number,
    a second ferromagnetic layer formed on the insertion layer and having magnetization of a direction substantially perpendicular to the first direction, a non-magnetic layer, and
    a third ferromagnetic layer formed on the non-magnetic layer and having a magnetization of a direction substantially parallel to the first direction at zero magnetic field.

26. The magnetoresistance effect head according to claim 25, wherein the oxides are selected from a group consisting of FeO, $Fe_3O_4$, $\alpha$—$Fe_2O_3$, and $\gamma$—$Fe_2O_3$.

27. The magnetoresistance effect head according to claim 25, wherein the oxides are selected from a group consisting of CrO, $Cr_2O_3$, $CrO_2$, $Cr_2O_5$, $CrO_3$, and $CrO_5$.

28. The magnetoresistance effect head according to claim 25, wherein the oxides are MnO and $MnO_2$.

29. The magnetoresistance effect head according to claim 25, wherein the second ferromagnetic layer is a magnetization free layer whose magnetization is substantially free to rotate in a signal magnetic field and the third ferromagnetic layer is a magnetization fixed layer whose magnetization is substantially fixed in the signal magnetic field.

30. The magnetoresistance effect head according to claim 25, wherein the third ferromagnetic layer is a magnetization free layer whose magnetization is substantially free to rotate in a signal magnetic field and the second ferromagnetic layer is a magnetization fixed layer whose magnetization is substantially fixed in the signal magnetic field.

31. The magnetoresistance effect head according to claim 25, wherein the magnetoresistance effect element is disposed apart from a medium facing surface, and further comprising magnetic yokes, the magnetic yokes extending from the medium facing surface to the magnetoresistance effect element and providing a signal magnetic field from the medium facing surface to the magnetoresistance effect element.

32. A magnetic reproducing apparatus, comprising:
    a magnetic recording medium and a magnetoresistance effect head reproducing a magnetic information recorded in the magnetic recording medium, the magnetoresistance effect element comprising:
    a first ferromagnetic layer having a magnetization of the a first direction,
    a magnetization-coupling layer formed on the first ferromagnetic layer,
    a second ferromagnetic layer formed on the magnetization-coupling layer, perpendicularly magnetic coupled with the first ferromagnetic layer by the magnetization-coupling layer, and having a magnetization substantially perpendicular to the first direction, a non-magnetic layer, and a third ferromagnetic layer formed on the non-magnetic layer and having a magnetization of a direction substantially parallel to the first direction at zero magnetic field.

33. A magnetic reproducing apparatus comprising:

a magnetic recording medium and a magnetoresistance effect head reproducing a magnetic information recorded in the magnetic recording medium, wherein the magnetoresistance effect element comprising:

a first ferromagnetic layer having magnetization of a first direction, an insertion layer formed on the first ferromagnetic layer and having a mixed phase film containing two kinds of oxides of a same metal each having a different valence number or a laminated film of two oxide layers of a same metal each having a different valence number, a second ferromagnetic layer formed on the insertion layer, and having magnetization of a direction substantially perpendicular to the first direction, a non-magnetic layer, and a third ferromagnetic layer formed on the non-magnetic layer and having the magnetization of a direction substantially perpendicular to the first direction.

34. A magnetic laminate, comprising:

a first ferromagnetic layer having a magnetization of a first direction, a second ferromagnetic layer having a second magnetization of a direction substantially perpendicular to the first direction, and an insertion layer formed between the first and second ferromagnetic layers and having a mixed phase film containing two kinds of oxides of a same metal, each having a different valence number, or a laminated film containing two oxide layers of a same metal, each having a different valence number.

35. The magnetic laminate according to claim 34, wherein the oxides are selected from a group consisting of FeO, $Fe_3O_4$, $\alpha$—$Fe_2O_3$, and $\gamma$—$Fe_2O_3$.

36. The magnetic laminate according to claim 34, wherein the oxides are selected from a group consisting of CrO, $Cr_2O_3$, $CrO_2$, $Cr_2O_5$, $CrO_3$, and $CrO_5$.

37. The magnetic laminate according to claim 34, wherein the oxides are MnO and $MnO_2$.

38. A magnetoresistance element, comprising:

a spin valve film comprising a first ferromagnetic layer having a magnetization substantially fixed in a first direction, a nonmagnetic layer formed on the first ferromagnetic layer, and a second ferromagnetic layer having a magnetization in a second direction substantially perpendicular to the first direction;

a magnetic coupling layer formed on either one of the first and second ferromagnetic layers; and a first ferromagnetic layer formed on the magnetic coupling layer and having a magnetization in a direction substantially perpendicular to the magnetization direction of the one of the first and the second ferromagnetic layers.

* * * * *